United States Patent
Imai et al.

[11] Patent Number: 6,089,487
[45] Date of Patent: Jul. 18, 2000

[54] PAPER MAGAZINE FOR A RECORDING PAPER ROLL AND RECORDING PAPER ROLL

[75] Inventors: Ryo Imai; Kenji Yamakawa; Norihisa Sutoh, all of Saitama, Japan

[73] Assignee: Fuji Photo Film Co., Ltd., Kanagawa, Japan

[21] Appl. No.: 08/895,458

[22] Filed: Jul. 16, 1997

[30] Foreign Application Priority Data

| Jul. 17, 1996 | [JP] | Japan | 8-187556 |
| Jul. 17, 1996 | [JP] | Japan | 8-187557 |
| Jul. 17, 1996 | [JP] | Japan | 8-187558 |
| Aug. 5, 1996 | [JP] | Japan | 8-206045 |
| Aug. 5, 1996 | [JP] | Japan | 8-206046 |

[51] Int. Cl.[7] ............... G03B 23/02; B65D 85/02
[52] U.S. Cl. .............. 242/348.4; 242/588.5; 355/72; 400/244
[58] Field of Search .............. 242/348, 348.3, 242/348.4, 342, 588.5, 538.4, 564.5, 542.3; 355/72; 400/242, 244

[56] References Cited

U.S. PATENT DOCUMENTS

| 3,091,412 | 5/1963 | Chambon | 242/542.4 |
| 4,201,354 | 5/1980 | Masiello et al. | 242/588.5 |
| 5,181,066 | 1/1993 | Ozawa et al. | 355/29 |
| 5,193,759 | 3/1993 | Bigelow et al. | 242/348.4 |
| 5,362,008 | 11/1994 | Nagel et al. | 355/72 X |

FOREIGN PATENT DOCUMENTS

| 6-79893 | 3/1994 | Japan . |
| 2139984 | 11/1984 | United Kingdom . |

*Primary Examiner*—John Q. Nguyen
*Attorney, Agent, or Firm*—Sughrue, Mion, Zinn Macpeak & Seas, PLLC

[57] ABSTRACT

A roll of a recording paper is rotatably contained in a paper magazine. The magazine is provided with a mouth through which the recording paper is drawn out and fed to a printer. A leading edge of the recording paper is adapted to come into contact with an outer periphery of the roll by a contacting device. The remainder of the roll is indicated by an indicating device. The mouth of the magazine is opened and closed with a shutter unit. The inside of the magazine tightly closed with the shutter unit is kept at constant humidity by a humidity conditioning paper. On the other hand, the roll is caught between a pair of flanges. One of the flanges is biased by plate springs toward the other of the flanges so that the roll is held in the magazine without looseness.

35 Claims, 15 Drawing Sheets

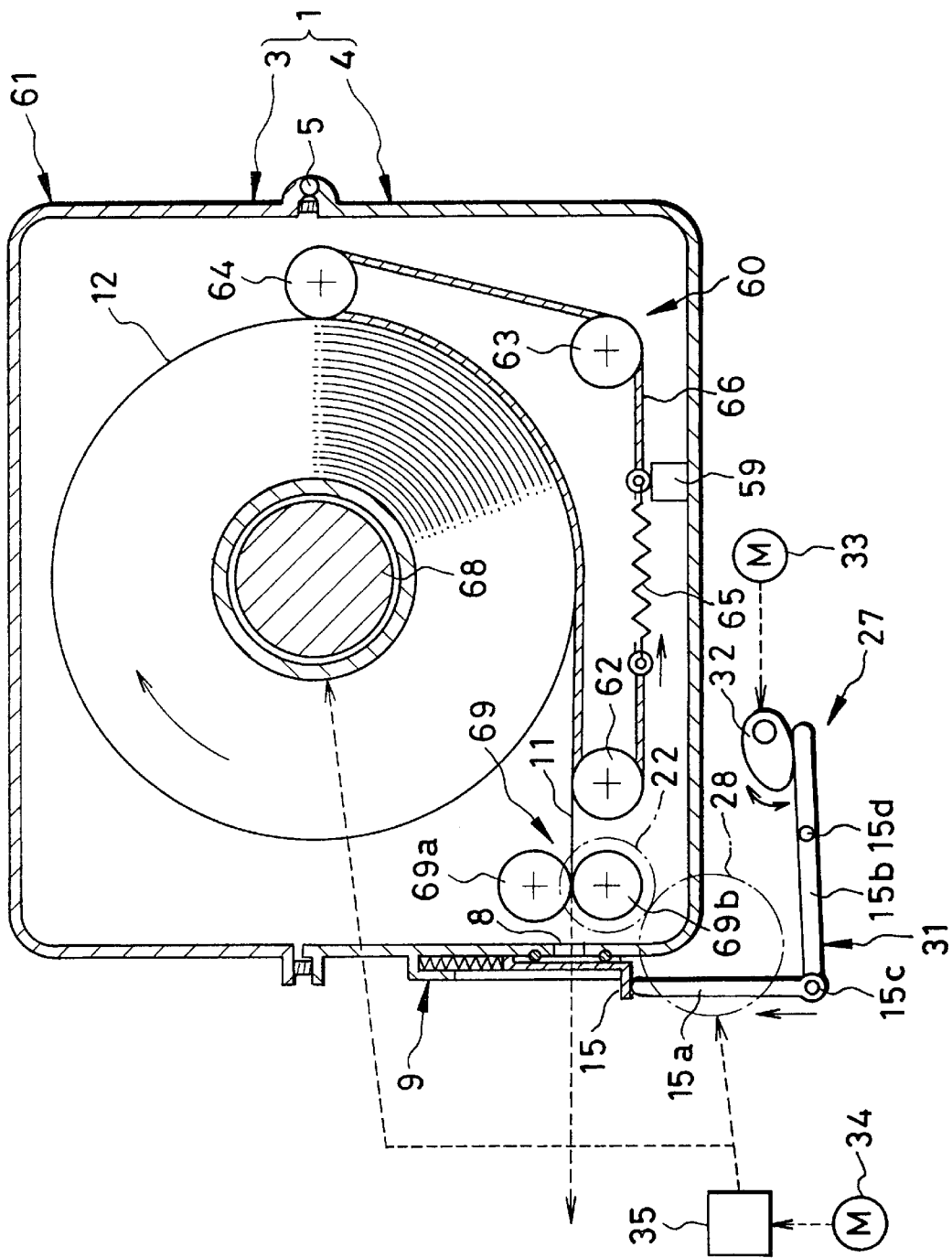

PAPER MAGAZINE FOR A RECORDING PAPER ROLL AND RECORDING PAPER ROLL

BACKGROUND OF THE INVENTION

1. Field of the Invention

The present invention relates to a paper magazine for a recording paper roll such as a roll of a film-like thermal recording paper, and to a recording paper roll for keeping humidity of the paper magazine at a constant level.

2. Description of the Related Art

For example, in a color thermal printer, a color thermal recording paper is used and three colors are recorded in order to record a full color image. As shown in FIG. 15, the color thermal recording paper 110 is provided with a cyan heat sensitive color layer 102, a magenta heat sensitive color layer 103, an yellow heat sensitive color layer 104, and a protect layer 105 which are stacked in order on a support member 101 utilizing a resin-coated paper. The yellow heat sensitive color layer 104, which is the uppermost layer among the color layers, has the highest heat sensitivity. The cyan heat sensitive color layer 102, which is the lowermost layer, has the lowest heat sensitivity. Each of the color layers is recorded in order from the uppermost. After a yellow image is recorded, near ultraviolet radiation of 420 nm is applied to fix the yellow image optically. Accordingly, non-colored ingredient of the yellow heat sensitive color layer 104 is not colored when thermal recording for the magenta heat sensitive color layer 103 is carried out. Similarly, after the recording for the magenta hest sensitive color layer 103 was carried out, ultraviolet radiation of 365 nm is applied to fix a magenta image optically.

For a personal-use thermal printer in which the amount of prints is small, cut papers are used. The paper is cut in a -predetermined size beforehand. However, for a business-use thermal printer in which the amount of prints is large, it is suggested that a roll-like color thermal recording paper is used and cut as a sheet after recording. For example, Japanese Patent Laid-Open Publication No. 6-79893 discloses a color thermal printer in which a pinch roller and a thermal head are disposed at an outer periphery of a platen roller. The color thermal recording paper is moved half round the platen roller so as to be folded back in a U-like shape. Successively, the color thermal recording paper is sent to an optical fixing unit. The fixing unit is constituted of two ultraviolet lamps and arranged such that the ultraviolet radiation from the lamp crosses the recording paper. One of the ultraviolet lamps is for fixing the yellow image and applies the near ultraviolet radiation of 420 nm to the recording paper. The other of the ultraviolet lamps is for fixing magenta and applies the ultraviolet radiation of 365 nm to the recording paper. At the downstream side, a cutter is disposed in front of a paper discharge port.

In this color thermal printer, the color thermal recording paper drawn out from the thermal recording paper roll is advanced and pulled back at a printing section. The advancement and the pulling back are performed one after the other in order to record a full color image in three-color frame sequential process. At the outset, the recording paper is advanced from the paper roll by a predetermined amount. After that, the platen roller and the paper roll are rotated in the reverse direction to pull back the recording paper. During the first pulling back, the recording paper is pressed and heated with the thermal head to record a yellow image in a record area line by line.

The recording paper is advanced from the paper roll again. At this time, the ultraviolet lamp for yellow image is turned on to fix the yellow heat sensitive color layer. During the second pulling back of the recording paper, the magenta image is recorded with the thermal head. After that, the recording paper is advanced again. At this time, the ultraviolet lamp for the magenta image is turned on to fix the magenta heat sensitive color layer. During the third pulling back, the cyan image is recorded in the cyan heat sensitive color layer one line by one line. After recording the cyan image, the recording paper is advanced from the paper roll and cut with the cutter as a sheet. The sheet is discharged and the thermal recording of one sheet is completed.

In case of the color thermal printer using the roll-like color thermal recording paper as described above, an amount of recording sheets cut from a thermal recording paper roll is very large so that it is possible to carry out a great number of prints without exchange of the thermal recording paper roll. However, if the thermal recording paper roll is taken out from a light shielding sack, and a dampproofing sack and so forth is set in the color thermal printer for a long time, the paper roll is exposed to the light entering the thermal printer so that the color ability thereof is reduced. Moreover, the color property of the recording paper is changed by the influence of humidity in the color thermal printer. Thus, it becomes impossible to color in a desired density. Further, if the ultraviolet ray from a fluorescent lamp and so on enters the color thermal printer, the color property is changed also at this time.

In order to prevent the color property of the recording paper from changing, it is considered, for example, that the remainder of the paper roll is taken out from the color thermal printer and contained in a dampproofing sack, a dampproofing box and so forth whenever the printing is over. However, it takes a lot of time and labor to do that. Further, the photosensitive thermal recording paper is exposed to the outside light in the course of containing it.

Thus, it is desirable to protect the thermal recording paper roll against the humidity and ultraviolet ray by containing it in a paper magazine. In this case, it is desired that after the printing was over, the recording paper sent in the color thermal printer is drawn back in the paper magazine and a draw-out mouth of the paper magazine is closed.

By using such a paper magazine, the influence of ultraviolet rays may be prevented. However, it is difficult to shut the paper magazine tightly and perfectly so that little air enters the paper magazine. Of course, the draw-out mouth is opened during the printing so that the air enters the paper magazine during that operation. If the recording paper is contained in the paper magazine for a long time, humidity for the recording paper changes gradually due to the air entering the paper magazine. At this time, the influence of humidity on the recording paper is different in accordance with each portion thereof. In other words, the influences of humidity for a roll portion and a leading edge portion apart from the roll portion are different.

At the roll portion, a color face of the color thermal recording paper contacts a rear face of one-round inner color thermal recording paper so that the color face is hardly affected by damp by the air entering the paper magazine. However, at the leading edge portion apart from the roll portion, the color face is exposed in the paper magazine so that the color face is affected by the damp in the paper magazine. When the printing is carried out for such a color thermal recording paper, color densities are different relative to the leading edge portion affected by the damp and the roll portion hardly affected by the damp.

In the case of using the paper magazine, it is desirable that a main body of the paper magazine is made of light shielding material so as not to expose the thermal recording paper roll to the natural light and the light from a fluorescent lamp. However, if the paper magazine is made of the light shielding material, there arises a problem in that the remainder of the paper roll contained in the magazine can not be observed from the outside. If the remainder of the paper roll is not known, it is impossible to foresee the exchange timing thereof. Thus, there arise problems in that the recording paper runs out during the printing, and that preparation of the paper roll is behind.

By the way, FIG. 16 is a graph showing a color property of the color thermal recording paper. Full lines show the color properties at 60%RH which is normal humidity at 25° C. Under an environment that the humidity is higher than that, the amount of moisture contained in the recording paper increases. As shown by dashed lines in FIG. 16, if a prescribed thermal energy is applied to the recording paper, each color of yellow(Y), magenta(M) and cyan(C) colors in paler density than an original color density. Under an environment that the humidity is lower than the normal humidity, the amount of moisture contained in the recording paper decreases rather than an amount relative to the normal humidity. In this case, as shown by broken lines in FIG. 16, if a prescribed thermal energy is applied to the recording paper, each color of Y, M and C colors in darker density than the original color density.

When the thermal recording paper roll is contained in the paper magazine, as the paper magazine does not have a humidity adjusting ability, the paper roll is not kept at the normal humidity. For example, if an outer environment of the paper magazine is in a high humidity state or a low humidity state when the paper roll is set in the paper magazine, the inside of the paper magazine is adapted to be kept in a state of high humidity or low humidity. Further, of course, the draw-out mouth for the recording paper is opened during the printing. Thus, the damp or the dry air enters the paper magazine through the draw-out mouth when the printing is carried out for a long time. By the outside air entering the magazine, the recording paper comes into a state of high humidity or low humidity gradually while is contained in the paper magazine.

A conventional paper magazine is constituted of a magazine main body formed with an elongated paper feed mouth and a lid rotatably attached to the magazine main body via a hinge. A recording paper roll is wound around a cylindrical core made of paper or plastic. When the paper roll is loaded in the paper magazine, a pair of flanges are attached to the core. Each of the flanges is provided with a shaft portion passing through a flange portion. A support portion is provided on an inside of the flange portion and fitted into the core. The shaft portion is put in a bearing of the magazine main body. The lid is closed after loading the paper roll.

However, in the conventional paper magazine, if there is looseness between the bearing of the magazine main body and the flange, the recording paper drawn out from the paper magazine is shifted from the regular position in width direction. Due to a gap of position, an image is not correctly printed a predetermined position of the recording paper.

Moreover, the paper roll is superfluously rotated by inertia after the drawing operation of the recording paper was stopped. And the paper roll is sometimes rotated by vibration and so forth during the printing. Thus, conventionally, a clutch device such as a friction clutch and so on is attached to a recording paper roll to give a back tension so that the paper roll is prevented from rotating inadvertently. However, upon using the clutch device, the structure of the paper magazine becomes complicated and the cost of it increases.

SUMMARY OF THE INVENTION

In view of the foregoing, it is a primary object of the present invention to provide a paper magazine for a recording paper roll in which the paper roll is kept in uniform humidity up to a leading edge portion thereof.

It is a second object of the present invention to provide a paper magazine for a recording paper roll in which a remainder of the paper roll is easily known from an outside of the paper magazine.

It is a third object of the present invention to provide a paper magazine for a recording paper roll in which the paper roll is set in a printer in a usable state.

It is a fourth object of the present invention to provide a paper magazine for a recording paper roll in which an inside of the paper magazine is adapted to be kept at a constant humidity.

It is a fifth object of the present invention to provide a recording paper roll for keeping the inside of the paper magazine at a constant humidity.

It is a sixth object of the present invention to provide a paper magazine for a recording paper roll in which looseness and racing of the paper roll are prevented by a simple structure and at low cost.

In order to achieve the above and other objects, the paper magazine for the paper roll comprises an endless belt movably arranged around a driving roller, a bias roller and a driven roller which are disposed in a triangular form. The bias roller is urged by a spring so that constant tension is applied to the endless belt. Thus, although a diameter of a recording paper roll changes, the endless belt always contacts a part of an outer periphery of the paper roll tightly. After printing is over, the endless belt is rotated in reverse direction to wind up a leading edge of the recording paper into the paper magazine. The leading edge is pressed by the endless belt and tightly contacts the outer periphery of the paper roll.

In other embodiment, the paper magazine is provided with a roll remainder indicator for indicating the remainder of the paper roll. The indicating device comprises an arm, a coil spring, an indicating member and a scale plate. The arm contacts the outer periphery of the paper roll. The coil spring biases the arm so as to press it to the outer periphery of the paper roll. The indicating member is for pointing out an amount of the remainder and is fixedly secured to one end of the arm. The scale plate is stuck on the outside of the paper magazine. The arm has a roller rotatably attached to the other end of the arm. The roller contacts the outer periphery of the paper roll. The arm rotates in accordance with the diameter of the paper roll so that a position of the indicating member is changed. The remainder of the recording paper is indicated due to the position of the scale plate pointed by the indicating member.

In another embodiment, the paper magazine is provided with a shutter unit for closing a draw-out mouth formed in a lower portion of the paper magazine in light-tight state. The shutter unit comprises a shutter being movable between a closed position in which the draw-out mouth is light-tightly closed and an open position in which the draw-out mouth emerges. The shutter is moved along a support frame. The shutter unit is operated by an operating device attached to the printer. Alternatively, the shutter unit is operated in association with the attachment and detachment of the paper magazine.

Further, in this paper magazine, a humidity conditioning paper is set. The humidity conditioning paper performs absorption of moisture when the interior humidity of the paper magazine is higher than the normal humidity. When the interior humidity is lower than the normal humidity, humidification is performed by the humidity conditioning paper. Accordingly, the interior humidity of the paper magazine is always kept at normal humidity. The recording paper is not affected by a change of the humidity.

In another embodiment, the paper magazine is provided with a plurality of plate springs attached around a bearing for the paper roll. The plate springs are disposed on a concentric circle centering around a rotational center of the paper roll. The plate springs contact one of the flanges of the paper roll and push it toward the other of the flanges. Thus, the paper roll is kept in the paper magazine without looseness so that the recording paper is stably drawn out from the paper magazine without meandering.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 5 is an explanatory illustration showing a second embodiment of the paper magazine according to the present invention;

DETAILED DESCRIPTION OF THE PREFERRED EMBODIMENT(S)

Figure 1:
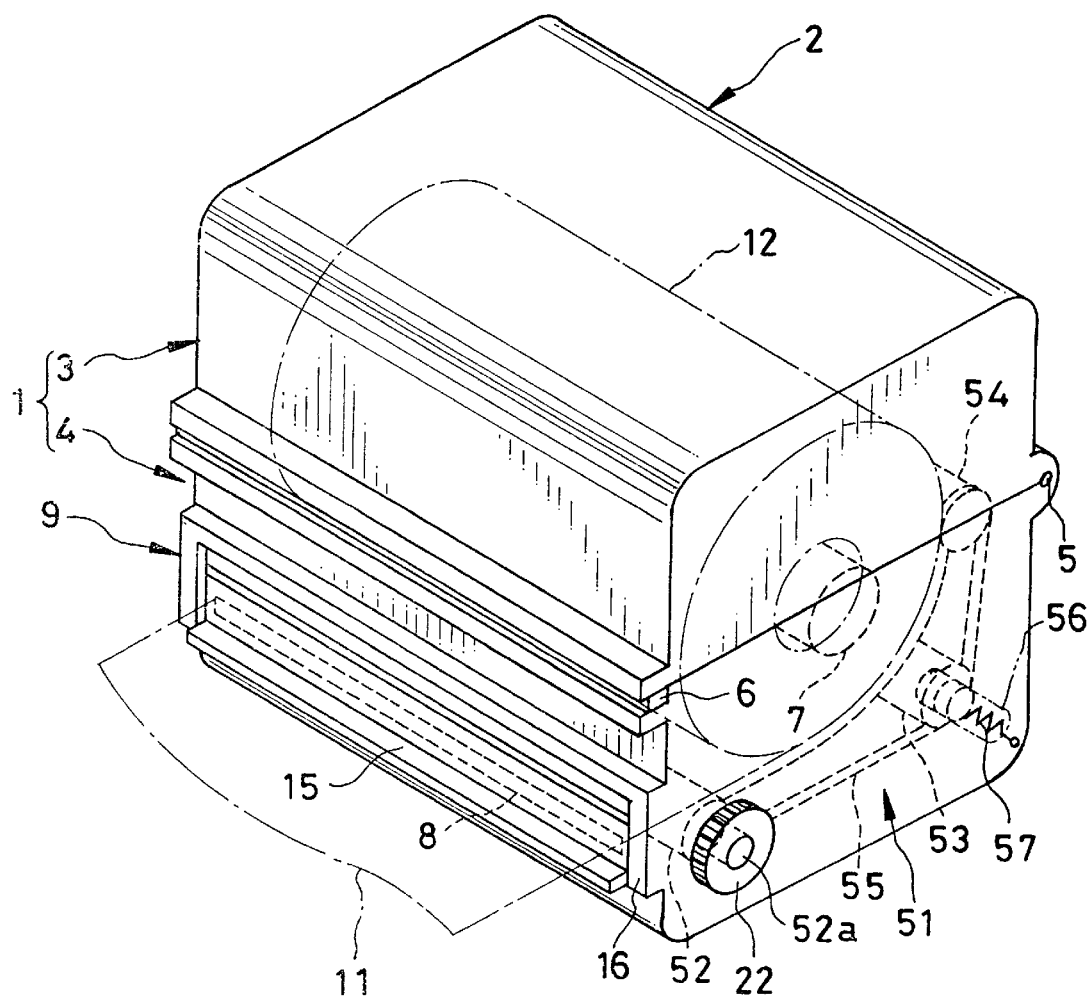
FIG. 1 is a perspective view showing a paper magazine for a recording paper roll according to the present invention.
Figure 2:
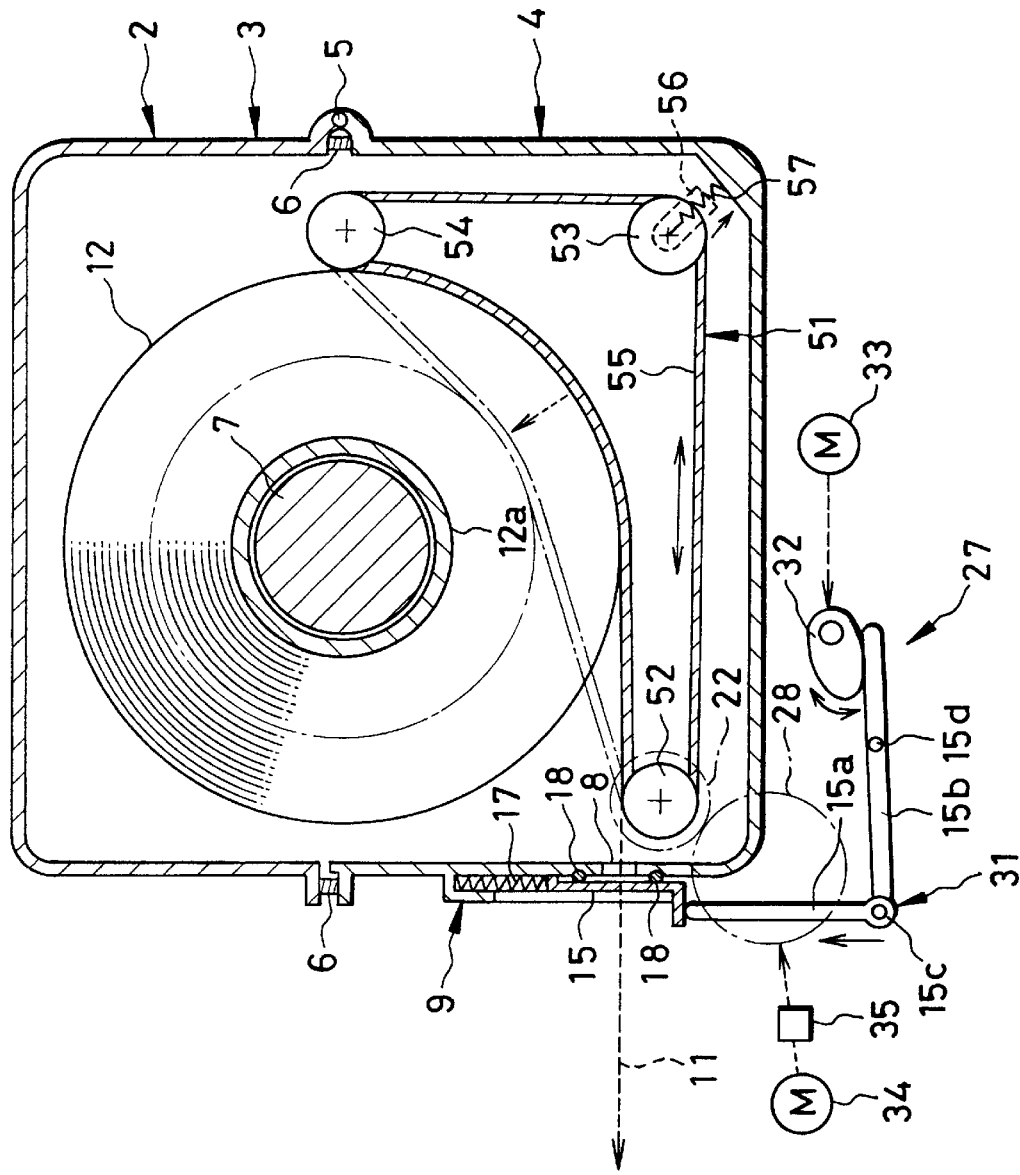
FIG. 2 is a sectional view of the paper magazine shown in FIG. 1.

FIG. 1 is a perspective view of a paper magazine for a thermal recording paper roll embodying the present invention and FIG. 2 is a sectional view thereof. A magazine main body 1 has a box-like shape and comprises an upper case 3 and a lower case 4, each of which is made of light shielding resin. The upper case 3 and the lower case 4 are swingably connected by a hinge the each other at a contact portion 5. Packing 6 is provided at the contact portion 5 and other contact portion of the upper case 3 and the lower case 4. The packing 6 keeps an inside of the magazine main body 1 in a light-tight state and prevents moisture and ultraviolet rays from entering the inside of the magazine main body 1.

A roll support shaft 7 is removably attached around a center of the paper magazine 2. The roll support shaft 7 is inserted into a core 12a of a thermal recording paper roll 12. the paper roll 12 is a roll of a film-like color thermal recording paper 11. the paper roll 12 is rotatably supported in the paper magazine 2. By the way, as well known, the color thermal recording paper 11 is a recording paper in which a cyan heat sensitive color layer, a magenta heat sensitive color layer and a yellow heat sensitive color layer are stacked in order. Each of the color layers has heat sensitivity being different from each other. The yellow heat sensitive color layer loses its color ability by applying near ultraviolet rays of 420 nm. The magenta heat sensitive color layer loses its color ability by applying ultraviolet rays of 365 nm.

At a lower portion of the paper magazine 2, a draw-out mouth 8 is provided. The draw-out mouth 8 is for drawing out the recording paper 11 and supplying it to a color thermal printer. Further, at the outside of the draw-out mouth 8, a shutter unit 9 for closing the draw-out mouth 8 in light-tight manner is provided. The shutter unit 9 is constituted of a shutter 15, a support frame 16, a spring 17 and a packing 18. The shutter 15 is movable in up-and-down direction. The support frame 16 supports both sides of the shutter 15. The spring 17 biases the shutter 15 in the down direction. The packing 18 is disposed between the shutter 15 and an outer face of the draw-out mouth 8.

The shutter 15 the lower portion of which is crooked, has an L-like shape and is movable between a closed position and an open position along the support frame 16. When the shutter 15 is set in the closed position, a front side of the draw-out mouth 8 is light-tightly covered therewith. When the shutter 15 is set in the open position, the shutter 15 is positioned above the draw-out mouth 8 so that the draw-out mouth 8 is exposed. The packing 18 contacts the edge of the draw-out mouth 8 and the inner face of the shutter 15 when the shutter 15 is set in the closed position so that the light and damp are prevented from entering the paper magazine 2 through a gap between the draw-out mouth 8 and the shutter 15. By the way, the shutter 15 is opened and closed by a shutter operating device attached to a color thermal printer as described below.

A contact conveying device 51 is provided along the paper roll 12 from vicinity of the draw-out mouth 8 to vicinity of the contact portion 5. The conveying device 51 makes the recording paper 11 contact an outer periphery of the paper roll 12 up to leading edge portion of the recording paper 11. Further, the conveying device 51 has a function that the recording paper 11 is sent to the thermal printer from the paper roll 12 via the draw-out mouth 8 and wound back in the magazine main body 1 up to the leading edge portion thereof after printing. The conveying device 51 is constituted of a driving roller 52, a bias roller 53, a driven roller 54 and an endless belt 55. The driving roller 52 is disposed near the draw-out mouth 8. The bias roller 53 is disposed near the corner of the lower case 4. The driven roller 54 is disposed near the inside of the contact portion 5. The endless belt 55 is movably attached to the three rollers 52, 53 and 54.

One end of an shaft 52a of the driving roller 52 penetrates the lower case 4 and extends to the outside thereof. A driven gear 22 is fixedly secured to the one end of the shaft 52a. The driven gear 22 meshes with a driving gear 28 when the paper magazine 2 is loaded in the color thermal printer. The driving gear 28 is rotated by a motor 34 via a clutch 35. The motor 34 is for advancing the recording paper placed in the color thermal printer. The bias roller 53 is movably attached along a groove 56 provided inside of the lower case 4 and biased toward the corner of the lower case 4 by a spring 57 in order to tighten the endless belt 55. Thus, although a diameter of the paper roll changes, the endless belt 55 always contacts with a part of the outer periphery of the paper roll 12 tightly.

Upon rotating the driving roller 52, the endless belt 55 is rotated around the three rollers 52, 53 and 54. When the endless belt 55 is rotated in counterclockwise direction in FIG. 2, the paper roll 12 is rotated in clockwise direction and the leading edge portion of the recording paper 11 is advanced to the outside of the paper magazine 2 through the draw-out mouth 8. When the endless belt 55 is rotated in the reverse direction, the paper roll 12 is rotated in the counterclockwise direction and the leading edge portion is wound up in the magazine main body 1. The leading edge portion is kept in a state that it is pressed to the paper roll 12.

A shutter operating device 27 shown in FIG. 2 is constituted of an actuating lever 31 for moving the shutter 15 up and down, a cam 32 for operating the actuation rod 31, and a motor 33 for rotating the cam 32. The actuating lever 31 comprises a first link 15a contacting the shutter 15 and a second link 15b contacting the cam 32. The first link 15a and the second link 15b are rotatably connected with a connecting shaft 15c. Further, the second link 15b is rotatably attached to a magazine loading section 26 at an axis portion 15d.

When the shutter 15 is opened, the motor 33 is driven to rotate the cam 32 in counterclockwise direction in FIG. 2. Due to the rotation of the cam 32, the second link 15b of the actuating lever 31 is rotated in clockwise direction around the axis portion 15d so that the first link 15a rises. A lower face of the shutter 15 is pushed up against the bias of the spring 17 so that the shutter 15 is moved to the open position. Accordingly, the draw-out mouth 8 emerges (refer to FIG. 4A). On the other hand, when the shutter 15 is closed, the motor 33 is rotated in reverse direction. Thus, the shutter 15 is pushed down by the bias of the spring 17 and moved to the close position to cover the draw-out mouth 8. The draw-out mouth 8 is closed in light-tight manner (refer to FIG. 4B).

Figure 3A:
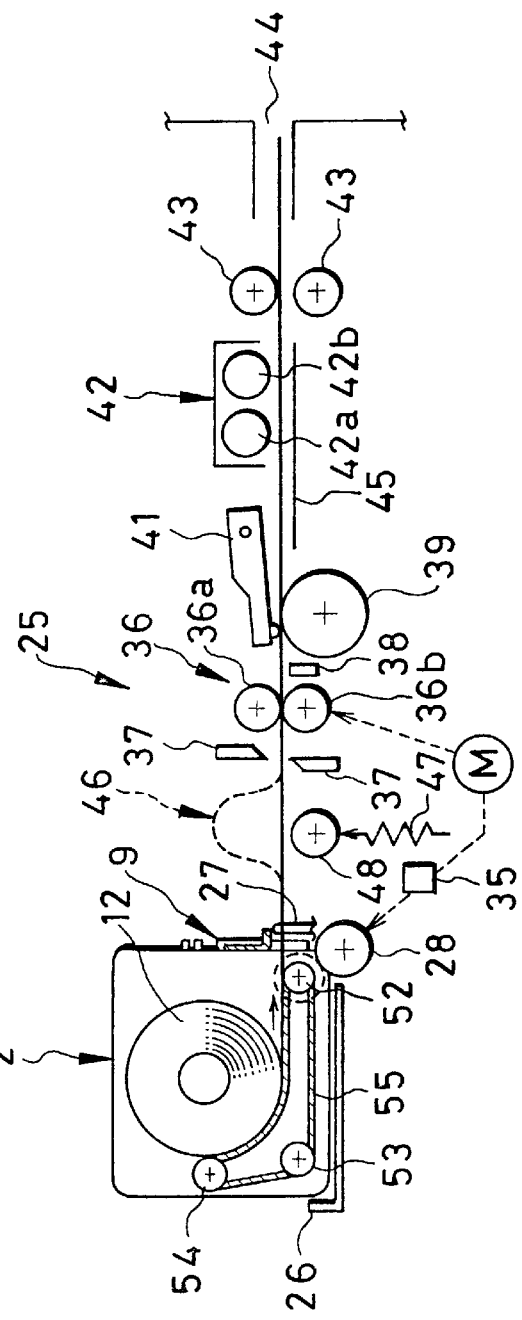
FIGS. 3A and 3B are schematic illustrations showing a structure of a color thermal printer.
Figure 3B:
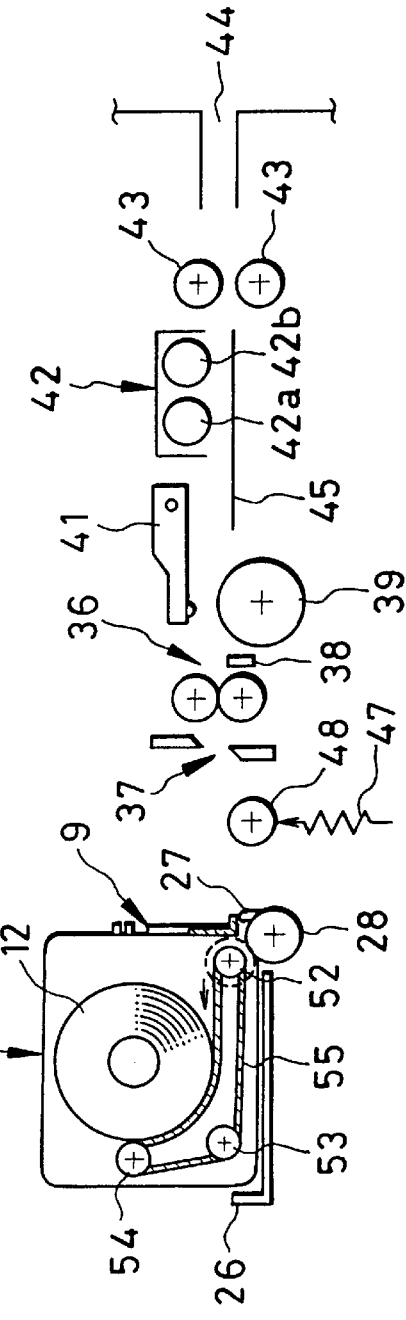

FIGS. 3A and 3B are explanatory illustrations showing a schematic structure of the color thermal printer. The paper magazine 2 is set on the magazine loading section 26 disposed at the paper feed side of the color thermal printer 25. The magazine loading section 26 is provided with the shutter operating device 27 and the driving gear 28.

At a downstream side of the magazine loading section 26, a loop forming portion 46 is provided. The loop forming portion 46 contains the recording paper 11 in loop-like form when the recording paper 11 is drawn back by a transporting roller pair 36. In this embodiment, the loop forming portion 46 is provided with a dancer roller 48 biased in an above direction by a spring 47 or the like and the recording paper 11 is pushed up so as to get rid of slackness thereof as shown by broken line in FIG. 3A. In order to prevent the paper roll 12 from being rotated by tension of the dancer roller 48, proper rotational load is given to the endless belt 55.

At a downstream side of the loop forming portion 46, a cutter 37 for cutting the recording paper 11 is disposed. An upper blade of the cutter 37 is movable and a lower blade thereof is fixed. After recording the full color image, the upper blade of the cutter 37 is moved so that a recorded area of the recording paper 11 is cut away as a sheet with the upper blade and the lower blade.

At a downstream side of the cutter 37, the transporting roller pair 36 is disposed. The transporting roller pair 36 nips the recording paper drawn out from the draw-out mouth 8 to convey it . An upper one of the transporting roller pair 36 is a capstan roller 36a and a lower one the roller pair 36 is a pinch roller 36b being movable in an up and down direction. Moreover, A sensor 38 for detecting the leading edge of the recording paper 11 is provided at the side of the transporting roller pair 36.

At a downstream side of the transporting roller pair 36, a platen roller 39 made of hard rubber is rotatably provided. A thermal head 41 is rotatably provided, opposing to the platen roller 39. The thermal head 41 presses and heats the recording paper 11 on the platen roller 39 to record a full color image in three-color frame sequential process. As well known, the thermal head 41 comprises a plurality of heating elements arranged in line in axial direction of the platen roller 39.

At a downstream side of the thermal head 41, an optical fixing unit 42 is disposed. The optical fixing unit 42 comprises an ultraviolet lamp 42a for fixing yellow image and an ultraviolet lamp 42b for fixing magenta image. The ultraviolet lamp 42a radiates the ultraviolet rays of which the wavelength is 420 nm and deprives the color ability of the yellow heat sensitive color layer. The ultraviolet lamp 42b radiates the ultraviolet rays of which the wavelength is 365 nm and deprives the color ability of the magenta heat sensitive color layer.

At a downstream side of the optical fixing unit 42, a paper discharge roller pair 43 is disposed. The paper discharge roller pair 43 nips the print sheet cut in the sheet-like form and discharges it from a paper discharge port 44 after full-color printing was over. Incidentally, reference numeral 45 denotes a guide plate forming conveyance passage of the recording paper 11.

Next, an operation of the above embodiment is described. The paper magazine 2 is set on the magazine loading section 26. In this state, the driven gear 22 disposed outside of the paper magazine 2 meshes with the driving gear 28.

Before printing, a main switch (not shown) of the color thermal printer 25 is turned on. When the main switch is turned on, the motor 33 is driven to rotate the cam 32 in counterclockwise direction in FIG. 2 so that the second link 15b of the actuating lever 31 is rotated around the axis portion 15d in a clockwise direction. The first link 15a rises and the shutter 15 is pushed up against the bias of the spring 17. Accordingly, the shutter 15 is moved to the open position and the draw-out mouth 8 emerges (refer to FIG. 4A).

After image data for printing is taken in, paper feeding is started by the instruction of a print via the operating section (not shown). During the paper feeding, the motor 34 is driven to rotate the driven gear 22 via the clutch 35 and the driving gear 28. Upon rotating the driven gear 22, the driving roller 52 coaxially provided therewith is rotated and the endless belt 55 is started to rotate in counterclockwise direction around the three rollers 52, 53 and 54.

When the endless belt 55 is rotated, the paper roll 12, a part of the outer periphery of which contacts the endless belt 55 tightly, is rotated in a clockwise direction with the endless belt 55. Thus, the leading edge portion of the recording paper 11 is conveyed to the draw-out mouth 8 along the endless belt 55. Upon further rotation of the endless belt 55, the leading edge potion of the recording paper 11 reaches the sensor 38 through the loop forming portion 46 and the cutter 37. When the sensor 38 detects the leading edge, the sensor 38 sends a signal to a controller (not shown). When the controller receives the signal, the transporting roller pair 36 is set in a nip state and the recording paper 11 is conveyed toward the thermal head 41. On the other hand, counting is started when the leading edge is detected in order to measure an amount of the recording paper 11 drawn out.

While the recording paper 11 is fed, the thermal head 41 is separated from the platen roller 39 and the recording paper 11 is conveyed toward the optical fixing unit 42 through a gap therebetween. The drawn amount of the recording paper 11 is measured by a counter. From a value of the counter, when it is judged that a cut position of the recording paper 11 reaches an upstream edge of the optical fixing unit 42, the conveying device 51 and the transporting roller pair 36 are stopped so that feeding of the recording paper 11 is stopped.

Successively, the controller rotates the motor 34 in a reverse direction to start a first draw-back operation of the recording paper 11 nipped with the transporting roller pair 36. The recording paper 11 drawn back is contained in the loop forming portion 46 by moving the dancer roller 48 in an above direction according to the draw-back amount thereof. While the recording paper 11 is drawn back, the clutch 35 is not connected so that the endless belt 55 is stopped. Although the recording paper 11 is pulled due to the ascent of the dancer roller 48, the endless belt 55 is adapted to be not rotated with the paper roll 12 by rotational load of the endless belt 55.

When an end edge of a record area of the recording paper 11 approaches the thermal head 41, the thermal head 41 is rotated to press the recording paper 11. After the thermal head 41 faced the end edge of the record area, a print control unit (not shown) drives the thermal head 41 in accordance with yellow image data to record the yellow image line by line. When the yellow image has been recorded on the record area of the recording paper 11 and the leading edge of the recording paper 11 is detected by the sensor 38, draw-back operation of the recording paper 11 is stopped. At the same time, the thermal head 41 is moved to a position in that the recording paper 11 is not pressed.

After the thermal head 41 is moved, the controller rotates the transporting roller pair 36 in the order direction again. The recording paper 11 contained in the loop forming portion 46 is advanced by a prescribed amount, lowering the dancer roller 48. At this time, the clutch 35 is not connected so that the endless belt 55 is still stopped. During the advancement of the recording paper 11, the ultraviolet lamp 42a for fixing yellow of the optical fixing unit 42 is turned on and the ultraviolet ray of 420 nm is radiated the record area of the recording paper 11 by a prescribed amount. Accordingly, the yellow heat sensitive color layer of the recording paper 11 loses its color ability.

Next, the second draw-back operation is started. When the end edge of the record area reaches the thermal head 41 again, the thermal head 41 is rotated to press the recording paper 11 again. At this time, the thermal head 41 is driven in accordance with magenta image data so that the magenta image is recorded on the recording paper 11 one line by one line. While the magenta image is recorded, the thermal head 41 generates greater thermal energy in comparison with the recording of the yellow image.

After recording the magenta image, the recording paper 11 is advanced by prescribed amount as described above. The ultraviolet lamp 42b for fixing magenta is turned on and the ultraviolet ray of 365 nm is radiated for the record area of the recording paper 11 by a prescribed amount. Thus, the magenta image is fixed.

During a third draw-back operation, the thermal head 41 generates greatest thermal energy in accordance with the cyan image data and records the cyan image on the record area of recording paper 11 line by line. After recording the cyan image, the thermal head 41 is moved away from the recording paper 11. When the recording of the cyan image is over, a full color image is formed on the recording paper 11.

When the leading edge of the recording paper 11 is detected by the sensor 38, the third draw-back operation is over and the recording paper 11 is advanced again. After that, when the cut portion of the recording paper 11 reaches the position of the cutter 37, conveyance of the recording paper 11 is stopped once. The cutter 37 is actuated to cut the recording paper 11 at the cut position. Thus, the recording paper 11 is cut away as a sheet-like print.

A leading edge of the sheet-like print reaches the paper discharge roller pair 43. The roller pair 43 is rotated, nipping the sheet-like print, to discharge it from the paper discharge port to a tray or the like. Finally, one full color print is completed.

In such a manner, full color prints are carried out by the necessary number. As the prints are carried out, a diameter of the paper roll 12 contained in the paper magazine 2 decreases. The bias roller 53 of the conveying device 51 is pulled by the spring 57. Accordingly, as the diameter of the paper roller 12 decreases, the bias roller 53 is moved toward the corner of the lower case along the groove 56. In other words, the whole of the endless belt 55 is pulled so that the endless belt 55 between the driving roller 52 and the driven roller 54 always contacts the outer periphery of the paper roll 12 tightly (refer the chain line in FIG. 2).

After the full color prints are carried out by the necessary amount, a user turns off a main switch of the color thermal printer 25. At this time, a power circuit of the color thermal printer 25 is not turned off at once and the conveying device 51 starts the draw-back operation of the recording paper 11. Namely, the motor 34 is rotated in the reverse direction and rotates the endless belt 55 in draw-back direction via the clutch 35. Accordingly, the paper roll 12 is rotated in the counterclockwise direction in FIG. 2.

Upon rotating the paper roll 12 in the reverse direction, the recording paper 11 drawn in the color thermal printer 25 is wound up into the paper magazine 2 through the draw-out mouth 8. When the leading edge of the recording paper 11 is drawn back and contacts the outer periphery of the paper roll 12 perfectly, the conveying device 51 is stopped. In this state, the leading edge of the recording paper 11 contacts the outer periphery of the paper roll 12 tightly so that the whole of recording paper 11 including the leading edge is kept in uniform humidity while the thermal printer is not used.

Figure 4A:
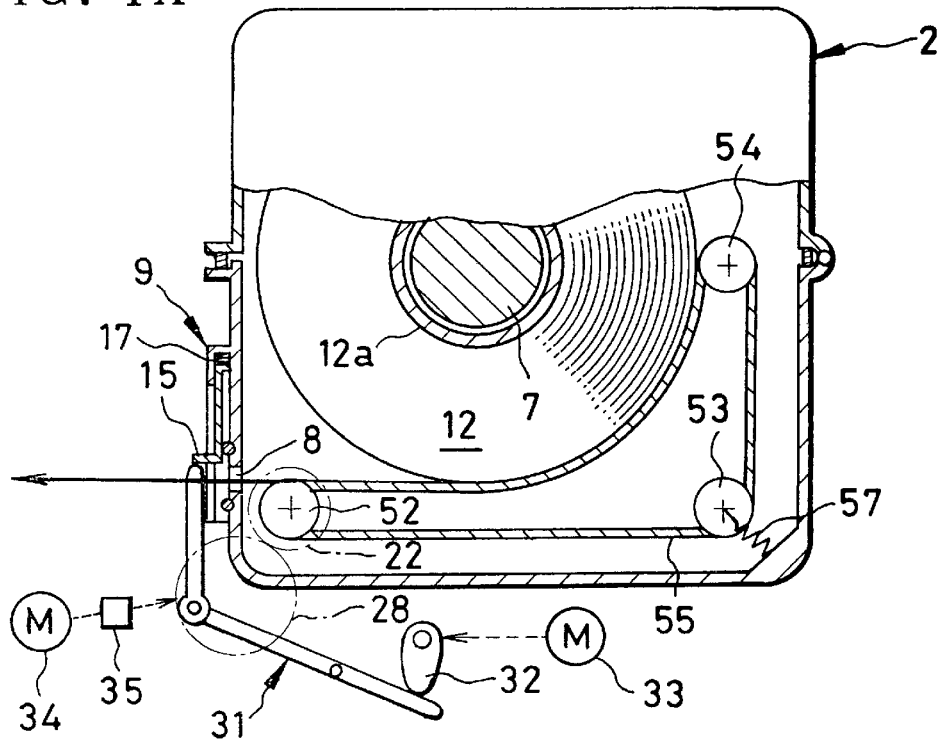
FIGS. 4A and 4B are explanatory illustrations showing works of the paper magazine.
Figure 4B:
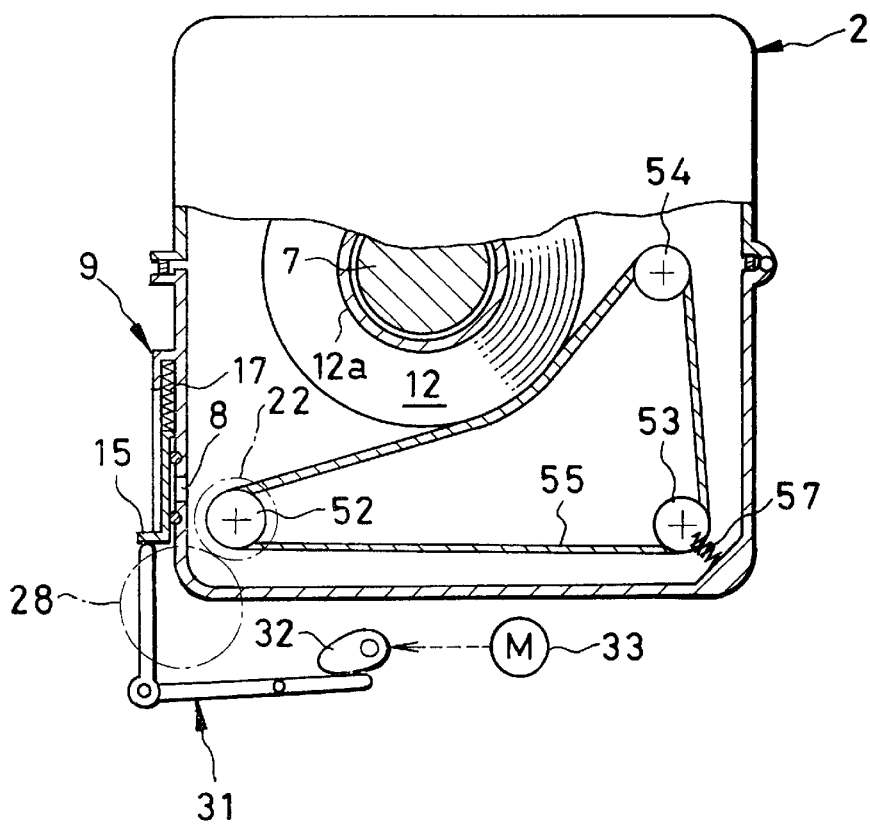

After winding up the recording paper 11, the motor 33 is rotated in the reverse direction to rotate the cam 32 in the clockwise direction in the FIG. 4A. As the cam 32 rotates in clockwise direction, the shutter 15 is pressed down by the bias of the spring 17 and moved to the closed position to cover the draw-out mouth 8. Thus, the draw-out mouth 8 is closed and the outside air and the ultraviolet rays are prevented from entering the paper magazine (refer to FIG. 4B). Further, after the shutter 15 is moved to the close position, the power circuit of the color thermal printer 25 is turned off and the whole actuation of the color thermal printer 25 is stopped.

On the other hand, when the recording paper 11 set in the paper magazine 2 is used up and the new recording paper roll 12 is loaded, the roll support shaft 7 is detached. The detached shaft 7 is inserted into the core 12a of the new recording paper roll 12 and set in the paper magazine 2 again, pressing the paper roll 12 against the bias of the endless belt 55.

In the above-described embodiment, the endless belt 55 has two functions, one of which is a function that the recording paper is wound up, and the other of which is a function that the recording paper contacts the outer periphery of the paper roll tightly up to the leading edge thereof. However, as a paper magazine shown in FIG. 5, a winding device may be provided besides a contacting device.

The paper magazine 61 shown in FIG. 5 has a contacting device 60 comprising three rollers 62, 63 and 64, and a belt 66, both ends of which are pulled by a spring 65 is each other. A part of the belt 66 is fixed with a fixing member 59 so that the belt 66 does not rotate. However, as both ends are pulled by the spring 65, the belt 66 is movable among the three rollers 62–64 by an amount corresponding to a slack thereof. The belt 66 always contacts a part of the outer periphery of the paper roll 12 tightly by urging of the spring 65 without regard to the diameter of the paper roll 12.

A magazine roller pair 69 comprising two magazine rollers 69a and 69b is provided near the draw-out mouth 8. The driven gear 22 is attached to one end of the magazine roller 69b. The driven gear 22 meshes with the driving gear 28 when the paper magazine 61 is set. A roll support shaft 68 supporting the paper roll 12 is rotated by the motor 34 via the clutch 35. Incidentally, the structure of the shutter operating device for opening and closing the draw-out mouth 8, the structure of the magazine main body 1 and so forth are similar to that of the first above embodiment.

As to the paper magazine 61 having such a structure, when the print of the thermal printer is started, at the outset, the shutter 15 of the shutter unit 9 is moved to open the draw-out mouth 8. After that, the roll support shaft 68 is rotated by the motor 34 to rotate the paper roll 12 in the clockwise direction in FIG. 5. Thus, the recording paper 11, the leading edge portion of which tightly contacts the outer periphery of the paper roll 12 with the belt 66, is sent toward the draw-out mouth 8, sliding on the belt 66. The leading edge of the recording paper 11 is nipped when it reaches the magazine roller pair 69 being rotated. The recording paper 11 is fed to the thermal printer from the draw-out mouth 8 by rotating the roll support shaft 68 and the magazine roller pair 69.

When the prints of necessary number are printed, the roll support shaft 68 and the magazine roller pair 69 start to rotate in the reverse direction so that the recording paper 11 drawn in the thermal printer is wound up in the paper magazine 61, sliding on the belt 66. When the leading edge portion reaches a position that the belt 66 contacts the outer periphery of the paper roll 12 tightly, the motor 34 is stopped. After that, the shutter 15 is moved to close the draw-out mouth 8. Also in this embodiment, the recording paper 11 tightly contacts the outer periphery of the paper roll 12 up to the leading edge portion.

By the way, the magazine roller pair 69 may be omitted. In this case, advancement and drawing back of the recording paper 11 are performed by only rotation of the roll support shaft 68. Further, in this case, it is preferable to form a guiding passage for the recording paper near the draw-out mouth of the paper magazine. Moreover, the number of the rollers supporting the endless belt may be four or more, or two.

Further, a quadrilateral sheet may be used. In this case, one side of the sheet is fixed and the other side of the sheet is movable toward the core in order to press the leading edge portion.

Figure 6A:
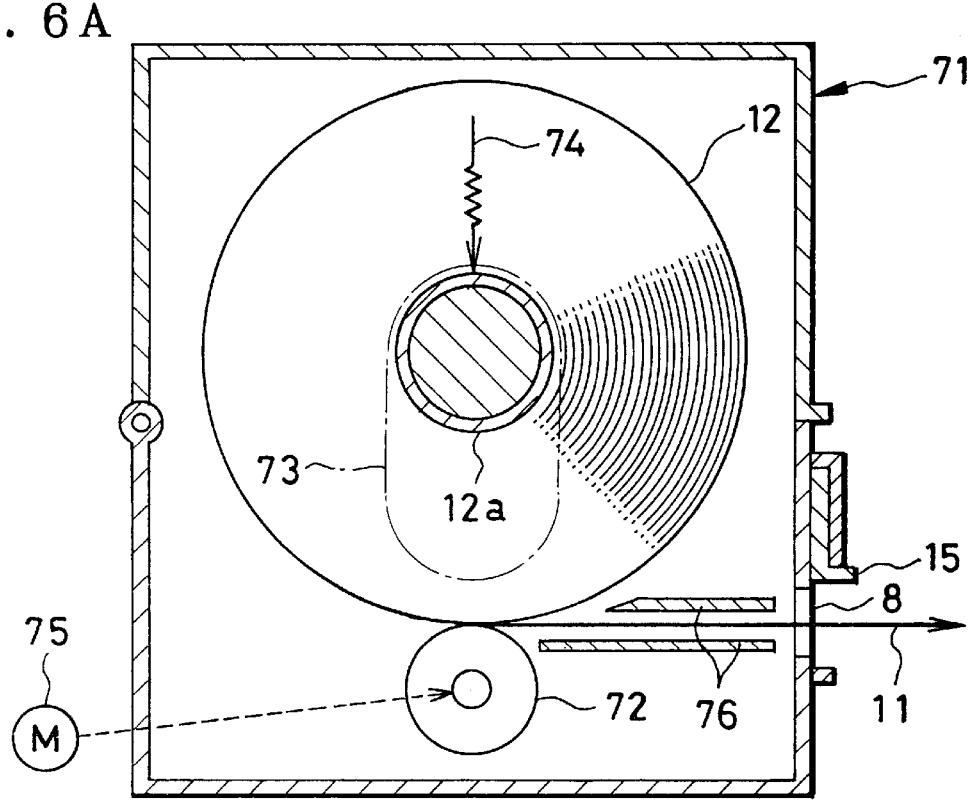
FIGS. 6A and 6B are explanatory illustrations showing a third embodiment of the paper magazine according to the present invention.
Figure 6B:
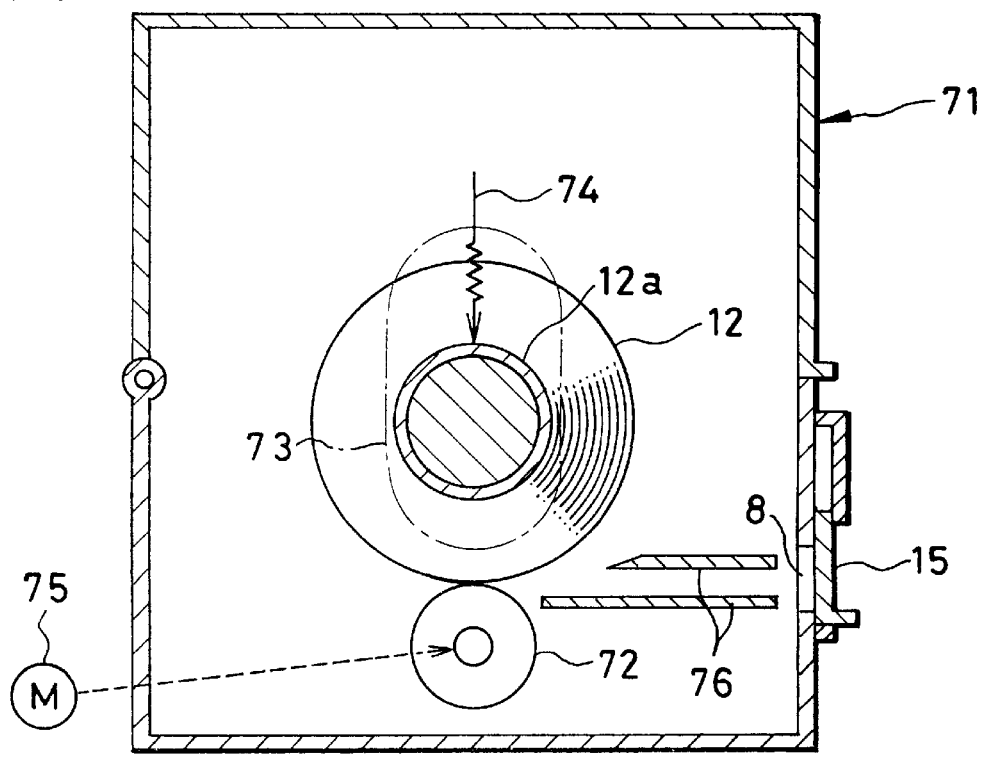

Besides the above embodiments, for example, a roller used as both of a contacting device and a winding device may be provided. A paper magazine 71 shown in FIGS. 6A and 6B is provided with a roller 72, a groove 73 and bias means 74. The roller 72 is used as both of a contacting device and a winding device. The groove 73 engages with the core 12a of the paper roll 12 and movably supports the paper roll 12 in an up-and-down direction. The bias means 74 biases the paper roll 12 toward the roller 72.

As to the paper magazine 71, as shown in FIG. 6A, when the print of the thermal printer is started, the shutter 15 is moved to open the draw-out mouth 8 and the roller 72 tightly contacting the outer periphery of the paper roll 12 is rotated by a motor 75 in clockwise direction in FIG. 6A. The recording paper 11 is sent out from the draw-out mouth 8 through a paper feed passage 76 and fed to the thermal printer.

During the print, the diameter of the paper roll 12 decreases by an amount of recording paper 11 drawn out from the paper magazine 71. Thereupon, the paper roll 12 is moved by the bias means 74 in the downward direction along the groove 73 (refer to FIG. 6B). Accordingly, the roller 72 always contacts a part of the outer periphery of the paper roll 12 tightly and the recording paper 11 is steadily sent out.

When the prints of necessary number are printed, the roller 72 is rotated the counterclockwise direction in FIG. 6B to pull the recording paper 11 sent out from the draw-out mouth 8 into the paper magazine 71. Then, when the leading edge portion of the recording paper 11 is drawn back to a position of the roller 72, the roller 72 is stopped to rotate and, at the same time, the shutter 15 is closed (refer to FIG. 6B). Detection of the recording paper 11 is carried out by a sensor (not shown)disposed near the roller 72. Also in this embodiment, the recording paper 11 tightly contacts the outer periphery of the paper roll 12 up to the leading edge portion thereof. In this state, the leading edge portion of the recording paper 11 tightly contacts the outer periphery of the paper roll 12 with the roller 72 so that the whole of recording paper 11 including the leading edge portion is kept a uniform humidity while the thermal printer is not used.

As to each of the above embodiments, opening and closing of the shutter may be performed for every print. Further, with respect to the opening and closing of a the shutter, the shutter may be automatically closed after the prints of predetermined number were printed. Moreover, a switch for opening and closing the shutter may be provided to open and close the shutter at the user's discretion (only when the print is performed). In this case, it is desirable that the opening and closing of the shutter are detected by a sensor or the like in order that the printing may be capable only when the shutter is opened and the shutter may be closed only when the recording paper is perfectly wound in the paper magazine up to the leading edge thereof.

In the above embodiments, the color heat sensitive recording paper is used as a recording paper. However, besides that, various recording papers requiring light shield and damp proof, for example, a photographic paper having photosensitivity and so forth, may be used.

Figure 7:
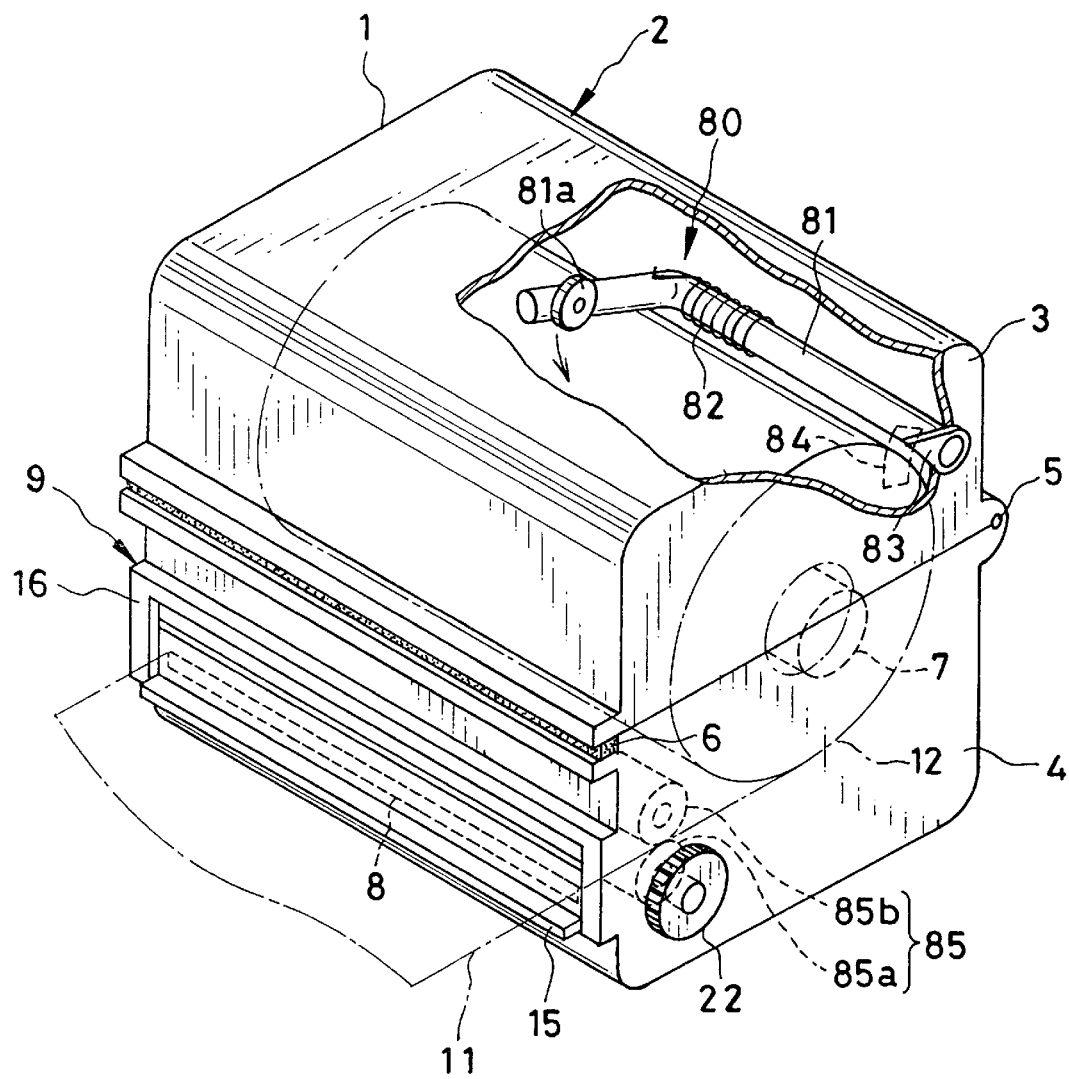
FIG. 7 is a perspective view showing a fourth embodiment of the paper magazine according to the present invention.

FIG. 7 shows another embodiment of the paper magazine according to the present invention. A magazine roller pair 85 comprising two magazine rollers 85a and 85b is rotatably attached inside the paper magazine 2 and near the draw-out mouth 8. The magazine rollers 85a and 85b come into contact with each other. The magazine rollers 85a and 85b nip the recording paper 11 to draw out it from the paper roll 12 and send it to the color thermal printer through the draw-out mouth 8. One end of an shaft of the magazine roller 85a penetrates the lower case 4 and reaches the outside. The driven gear 22 is fixedly secured to the one end of the shaft and meshes with the driving gear 28 provided in the color thermal printer. The magazine roller pair 85 is rotated in association with the paper advancement performed in the color thermal printer.

A roll remainder indicator 80 for indicating the remainder of the paper roll 12 is attached to the upper case 3 of the paper magazine 2. The roll remainder indicator 80 comprises an arm 81, a coil spring 82, an indicating member 83 and a scale plate 84. The arm 81 contacts the outer periphery of the paper roll 12. The coil spring 82 biases the arm 81 so as to press it to the outer periphery of the paper roll 12. The indicating member 83 is fixedly secured to one end of the arm 81 projecting out of the main body 1. The scale plate 84 is stuck on the upper case 3.

The arm 81 has L-like shape and one end of which is rotatably attached to the upper case 3. A rotatable roller 81a made of rubber or the like is attached to the other end of the arm 81 so as to contact the outer periphery of the paper roll 12. On the scale plate 84, there are written scales at equal intervals from "F" representing the remainder of the unused state to "E" representing a state that the remainder of the paper roll 12 has run out. The indicating member 83 points to one of the scales so that the remainder is indicated.

The roller 81a of the arm 81 is always pressed to the outer periphery of the paper roll 12 by the bias of the coil spring 82. At this time the biasing force of the coil spring is minimized and the roller 81a contacts the paper roll 12 so that the recording paper 11 is not damaged by the indicating device 80.

When a new recording paper roll 12 is loaded in the paper magazine 2, the upper case 3 of the paper magazine 2 is rotated to open the main body 1, centering around the contact portion 5. The roll support shaft 7 is detached from the paper magazine 2 and inserted into the core 12a of the paper roll 12. The roll support shaft 7 is set in the main body 1 again with the paper roll 12. Further, the recording paper 11 is slightly drawn by rotating the paper roll 12 and the leading edge thereof is put in the magazine roller pair 85 to be nipped.

Figure 8A:
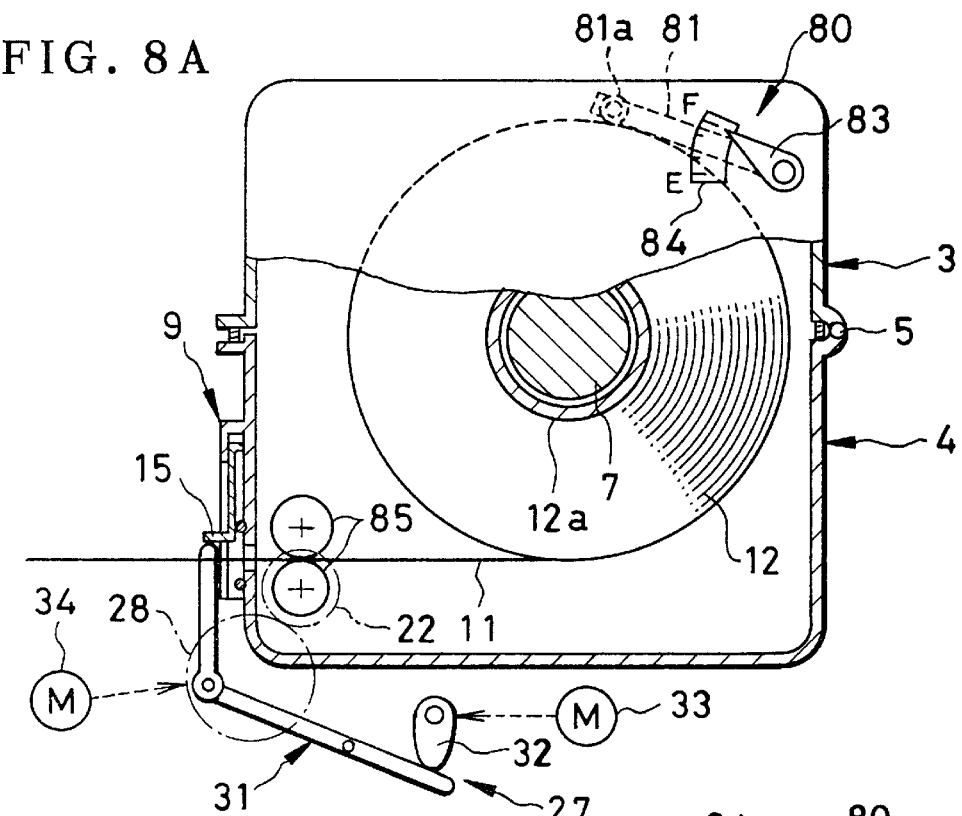
FIGS. 8A and 8B are explanatory illustrations showing works of the paper magazine in FIG. 7.

When the upper case 3 is rotated to close the main body 1, as shown in FIG. 8A, the arm 81 biased in counterclockwise direction by the coil spring 52 contacts the outer periphery of the paper roll 12. Upon closing the upper case 3 completely, the indicating member 83 attached to one end of the arm 81 points to the position "F" of the scale plate 84. Accordingly, the indicating member 83 indicates that the whole amount of the paper roll 12 remains.

As the printing is performed, the diameter of the paper roll 12 decreases. The arm 81, the roller 81a of which always contacts the outer periphery of the paper roll 12, is rotated in a counterclockwise direction in accordance with the decrease of the diameter of the paper roll 12. Thus, the indicating member 83 attached to one end of the arm 81 is moved on the scale plate 84 toward the position "E".

Due to observing a position of the scale plate 84 pointed by the indicating member 83, a user can recognize the remainder of the paper roll 12 without opening the light-tight paper magazine 2.

Figure 8B:
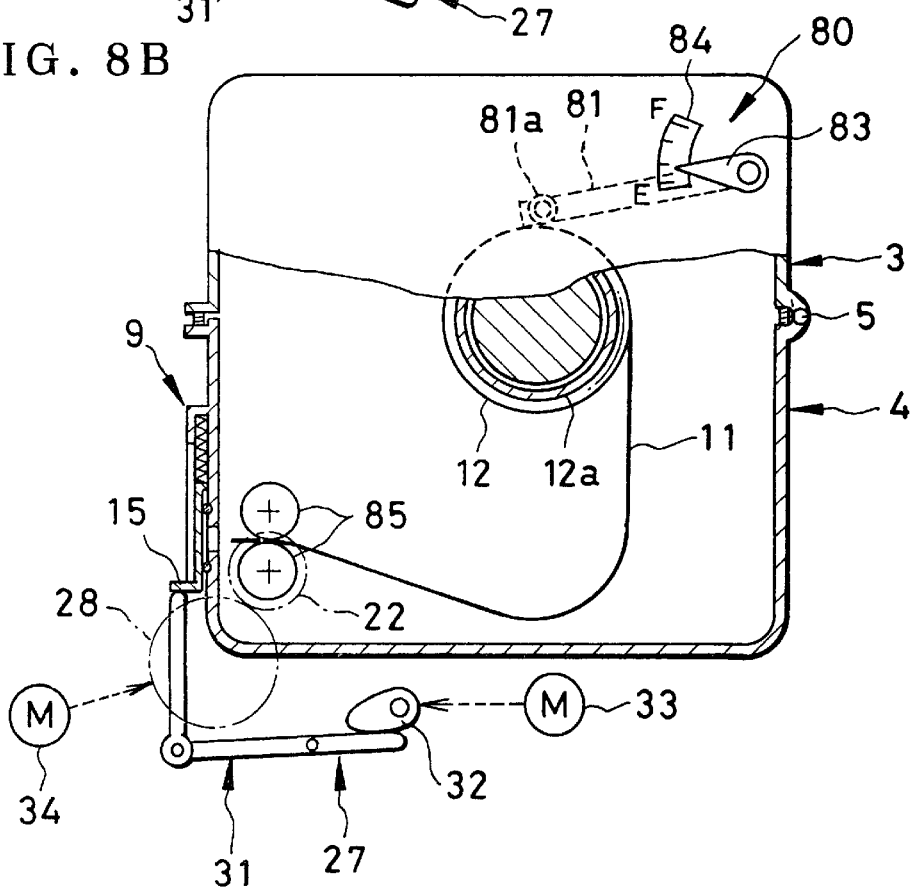

As shown in FIG. 8B, when the remainder of the paper roll 12 almost runs out, the indicating member 83 is moved to near the place of the position "E" of the scale plate 84. The user exchanges the paper roll 12 when the indicating member 83 comes near the position "E" of the scale plate 84. Accordingly, there does not arise a problem in that the printing is continued although the remainder of the paper roll 12 almost runs out and the recording paper runs out during the printing.

In the above embodiment, the roller 81a is provided at the top end of the arm 81 of the indicating device 80. However, the arm 81 may contact the outer periphery of the paper roll directly without the roller 81a. In this case, it is preferable that the biasing force of the arm 81 is weakened so as not to rub the rear face of the recording paper with the arm strongly. Moreover, in the above embodiment, the arm 81 is biased toward the outer periphery of the paper roll by the coil spring 82. However, the arm 81 may contact the outer periphery of the paper roll due to its own weight without biasing the arm.

Figure 9A:
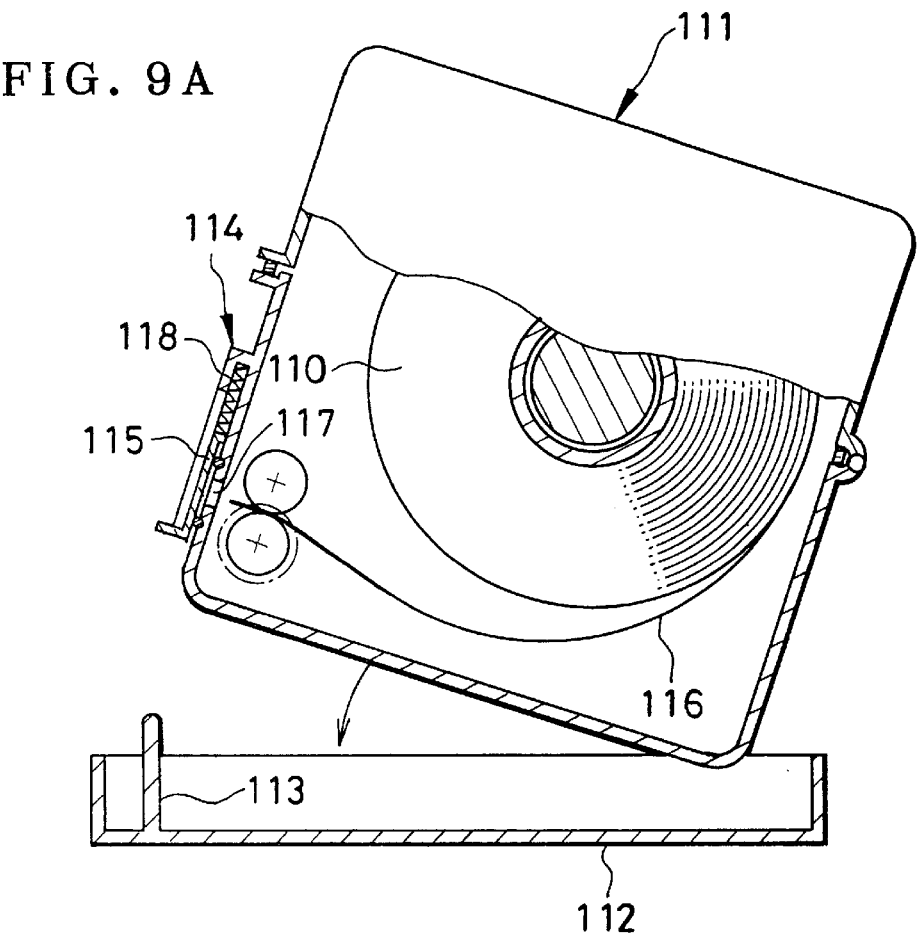
FIGS. 9A and 9B are explanatory illustrations showing a fifth embodiment of the paper magazine according to the present invention.

In the above embodiments, the shutter of the paper magazine opens and closes the draw-out mouth due to ON and OFF operation of the main switch of the color thermal printer. However, the shutter may be opened and closed in association with attachment and detachment of the paper magazine. For example, as to a paper magazine 111 for a heat sensitive recording paper roll 110 shown in FIGS. 9A and 9B, a shutter 115 of a shutter unit 114 is opened by an operating member 113 protruding on a magazine loading section 112 of the color thermal printer when the paper magazine 111 is set on the magazine loading section 112.

The shutter unit 114 having similar construction to the above embodiment is provided in front of a draw-out mouth 117 for drawing out a heat sensitive recording paper 116 from the paper magazine 111. The shutter 115 is movably attached to the shutter unit 114 in up and down direction, and biased toward a close position by means of a spring 118. Thus, the draw-out mouth 117 is covered with the shutter 115 when the paper magazine 111 is not set in the thermal printer (not shown) so that the inside of the paper magazine 111 is kept in light-tight state and humidity does not enter the paper magazine 111 (refer to FIG. 9A). Accordingly, it does not occur that the paper roll 110 is exposed to the light and desired color density can not be obtained due to the humidity.

Figure 9B:
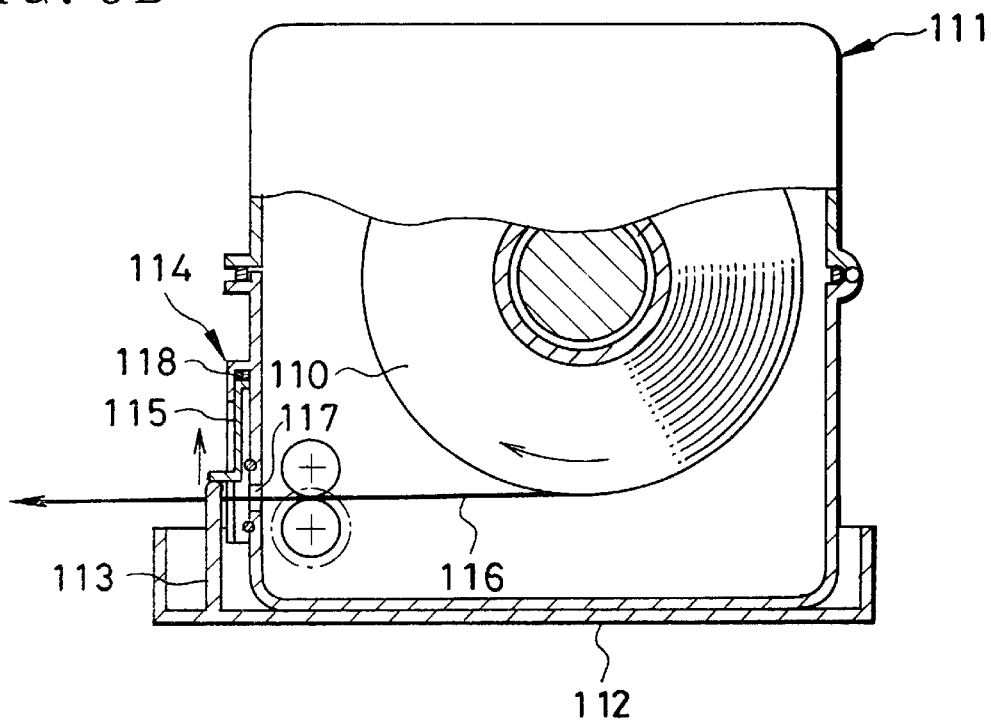

When the paper magazine 111 is set on the magazine loading section 112 of the thermal printer, the operating member 113 protruding on the magazine loading section 112 contacts the lower portion of the shutter 115 and pushes it up against the bias of the spring 118 (refer to FIG. 9B). Thus, the draw-out mouth 117 emerges so that it becomes possible to draw out the recording paper 116 and perform the thermal recording. When the paper magazine 111 is detached from the magazine loading section 112, the shutter 115 is released from the press of the operating member 113 and lowered to the closed position by mean of the spring 118 so that the draw-out mouth 117 is closed.

In the above-described embodiment, as the mechanism for opening and closing the shutter 115, the operating member 113 for pushing the shutter up is merely provided on the magazine loading section 112. Accordingly, the operating mechanism for the shutter may be constructed in a simple manner and at a low cost. Further, the shutter 115 may be certainly opened and closed in association with attachment and detachment of the paper magazine 111. Alternatively, the shutter 115 may be opened and closed by hand.

Figure 10:
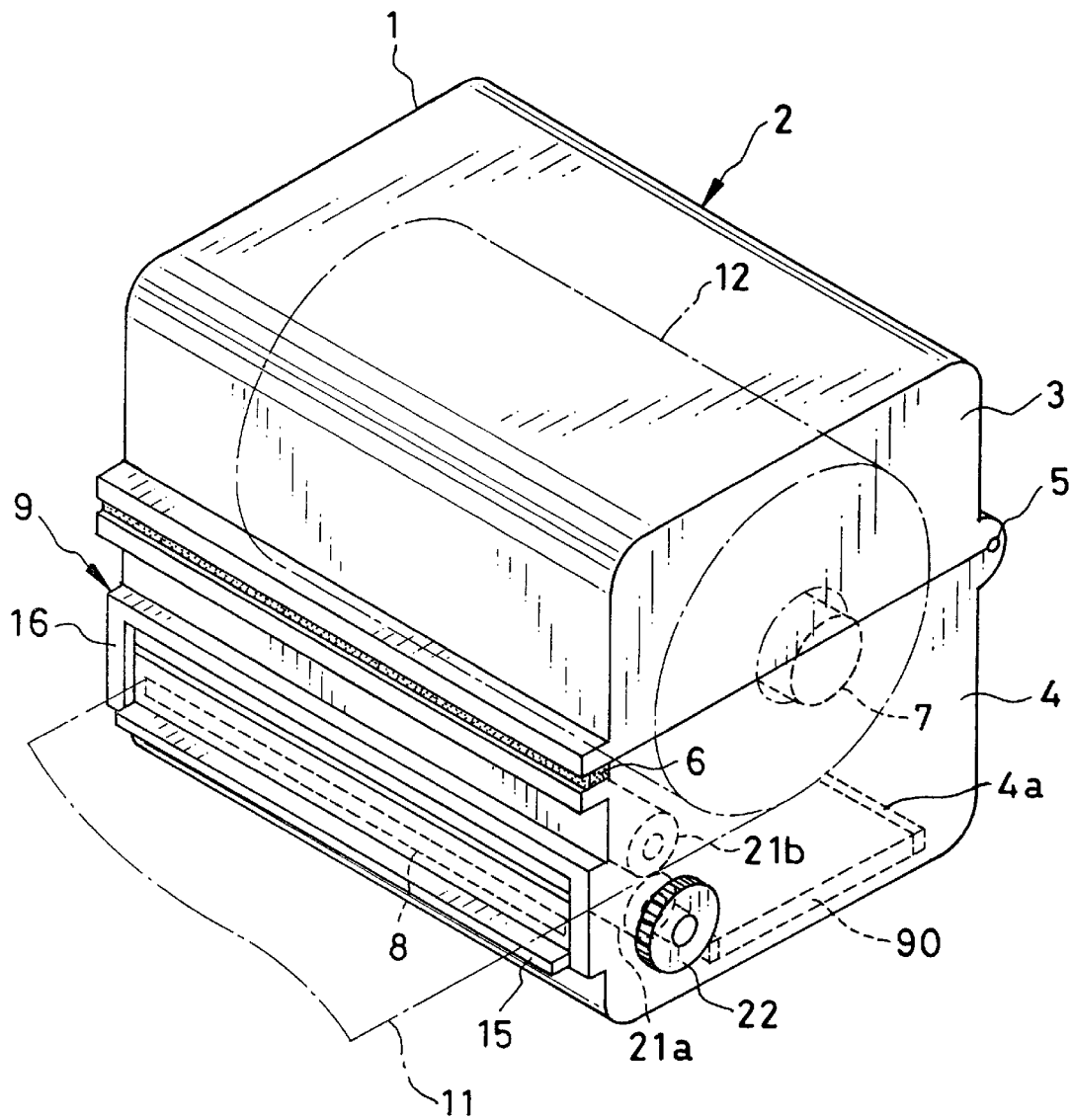
FIG. 10 is a perspective view showing a sixth embodiment of the paper magazine according to the present invention.

Next, FIG. 10 shows another embodiment of the paper magazine according to the present invention. At an inside lower portion of the paper magazine 2, a space is formed so as to contain the recording paper 11 in a loop-like state when the recording paper 11 is drawn back in the process of printing. A humidity conditioning paper 90 is provided on a tray 4a which is formed inside of the lower case 4. The tray 4a is integrally formed with the lower case 4. The humidity conditioning paper 90 is made of a humidity conditioning material keeping the inside of the paper magazine of a constant humidity.

As the humidity conditioning paper 90, for example, there is SHC (Super Humidity Controling ) paper (trade name, manufactured by Tokushu Seishi Co., Ltd.) disclosed in "Polyfile" (March 1994, Vol. 31, No. 361, pp. 56–58) and "TRIggER" (May 1993, Vol. 12, No. 5, pp. 60–63). The humidity conditioning paper 90 comprises a porous inorganic powder material and cellulose fiber. Preprocess is performed for the humidity conditioning paper. The humidity conditioning paper is left in a predetermined humidity environment more than four hours before using it. After that, the humidity conditioning paper 90 is mounted in a conditioned space.

When the space in which the humidity conditioning paper 90 is mounted becomes a higher humidity than the predetermined humidity, the humidity conditioning paper 90 absorbs moisture in the space. The absorption of moisture is rapidly performed until the space becomes the predetermined humidity environment. On the other hand, when the space becomes a lower humidity than the predetermined humidity, moisture absorbed in the humidity conditioning paper 90 is released in the space. The humidification is performed until the space becomes the predetermined humidity environment. Accordingly, the space is kept at a predetermined humidity environment. As to amount used for the humidity conditioning paper 90, 1–2 Kg per 1 $m^3$ of for the space is preferable.

The humidity conditioning paper 90 set on the tray 4a is left in a normal humidity environment of 60%RH for more than four hours. The normal humidity environment has a humidity at which the recording paper 11 colors based on the prescribed color property. When the interior humidity of the paper magazine 2 is higher than the normal humidity, the humidity conditioning paper 90 performs absorption of the moisture. When the interior humidity is lower than the normal humidity, humidification is performed by the humidity conditioning paper 90. Accordingly, the interior humidity of the paper magazine 2 is always kept at a normal humidity.

The humidity conditioning paper 90 has a honeycomb structure in order to expand the surface area thereof and perform the humidity conditioning in an efficient manner. The humidity conditioning paper 90 maintains the prescribed humidity conditioning ability for about five years in general. When the humidity conditioning ability is reduced, a new humidity conditioning paper 90 for which preprocess is performed is set on the tray 4a.

Figure 11:
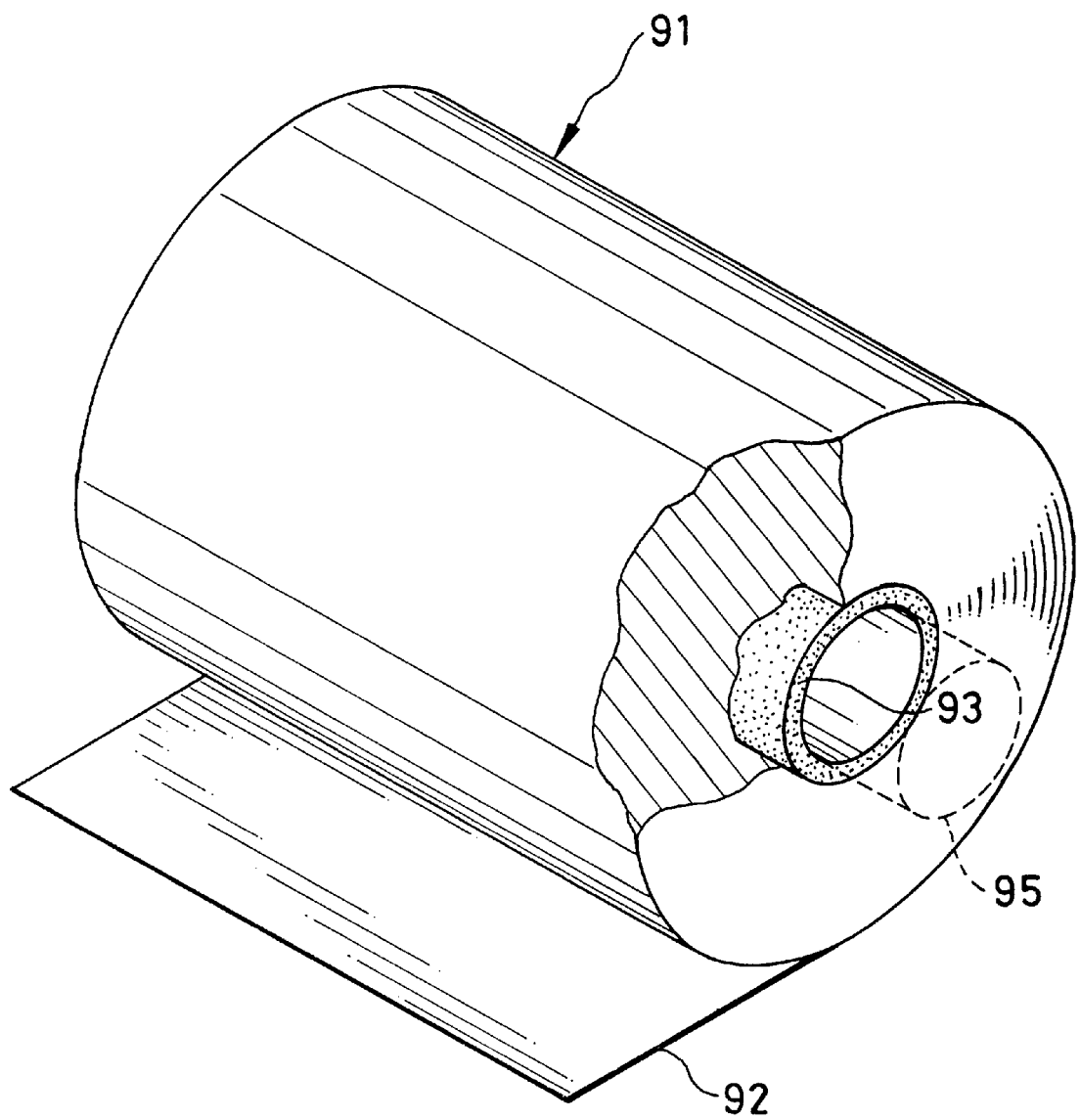
FIG. 11 is a perspective view showing a thermal recording paper roll, a core of which is made of humidity conditioning material.

FIG. 11 shows an embodiment in that a core made of a humidity conditioning material is employed. A thermal recording paper roll 91 consists of a film-like color thermal recording paper 92 wound around the core 93. The core 93 is made such that the humidity conditioning material, for example, the humidity conditioning paper is formed in a cylindrical shape. As described above, the SHC paper and so forth are used as the humidity conditioning paper.

For the core 93, a preprocess is performed. The core 93 is left in the normal humidity environment for more than four hours when the paper roll 91 is manufactured. The normal humidity environment has a humidity at which the recording paper 92 colors in the most suitable density. After that, the recording paper 92 is wound around the preprocessed core 93 and the paper roll 91 is manufactured.

As described above, the core 93 of the paper roll 91 is made of the humidity conditioning paper. Accordingly, by setting the paper roll 91 to an attachment rod 95 of the paper magazine in which the humidity conditioning material is not provided, the inside of the paper magazine is kept at a normal humidity due to the humidity conditioning function of the core 93.

Moreover, whenever a new recording paper roll 91 is set to the paper magazine, the core 93 is exchanged therewith so that the humidity conditioning of the paper magazine is always performed by a new humidity conditioning material. Accordingly, it is not necessary to pay attention to the exchange of the humidity conditioning material.

In the above-described embodiments, the SHC paper is used as an example of the humidity conditioning material. However, this is not exclusive. Other humidity conditioning materials having similar characteristic may be used.

Figure 12:
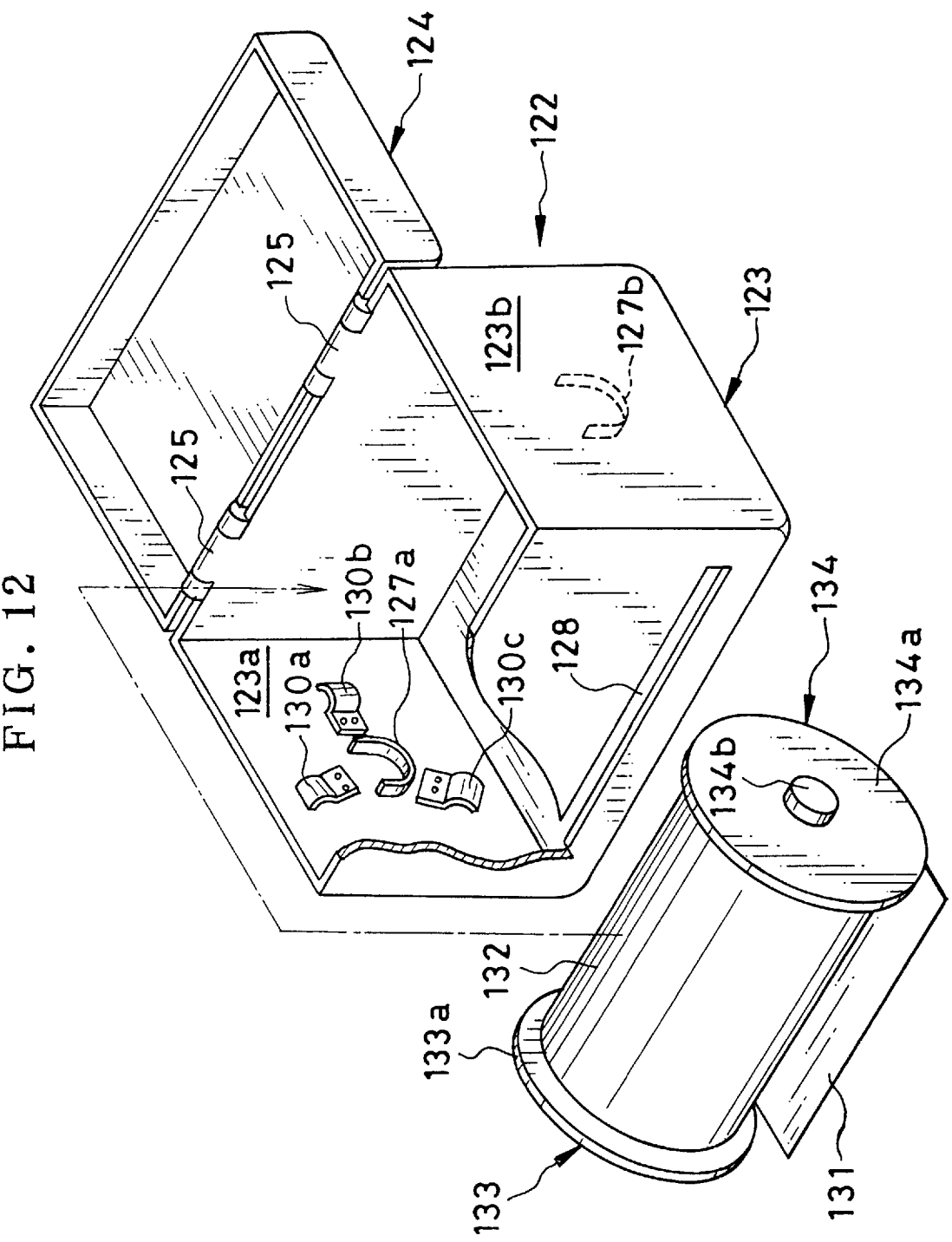
FIG. 12 is a perspective view showing a seventh embodiment of the paper magazine according to the present invention.
Figure 13:
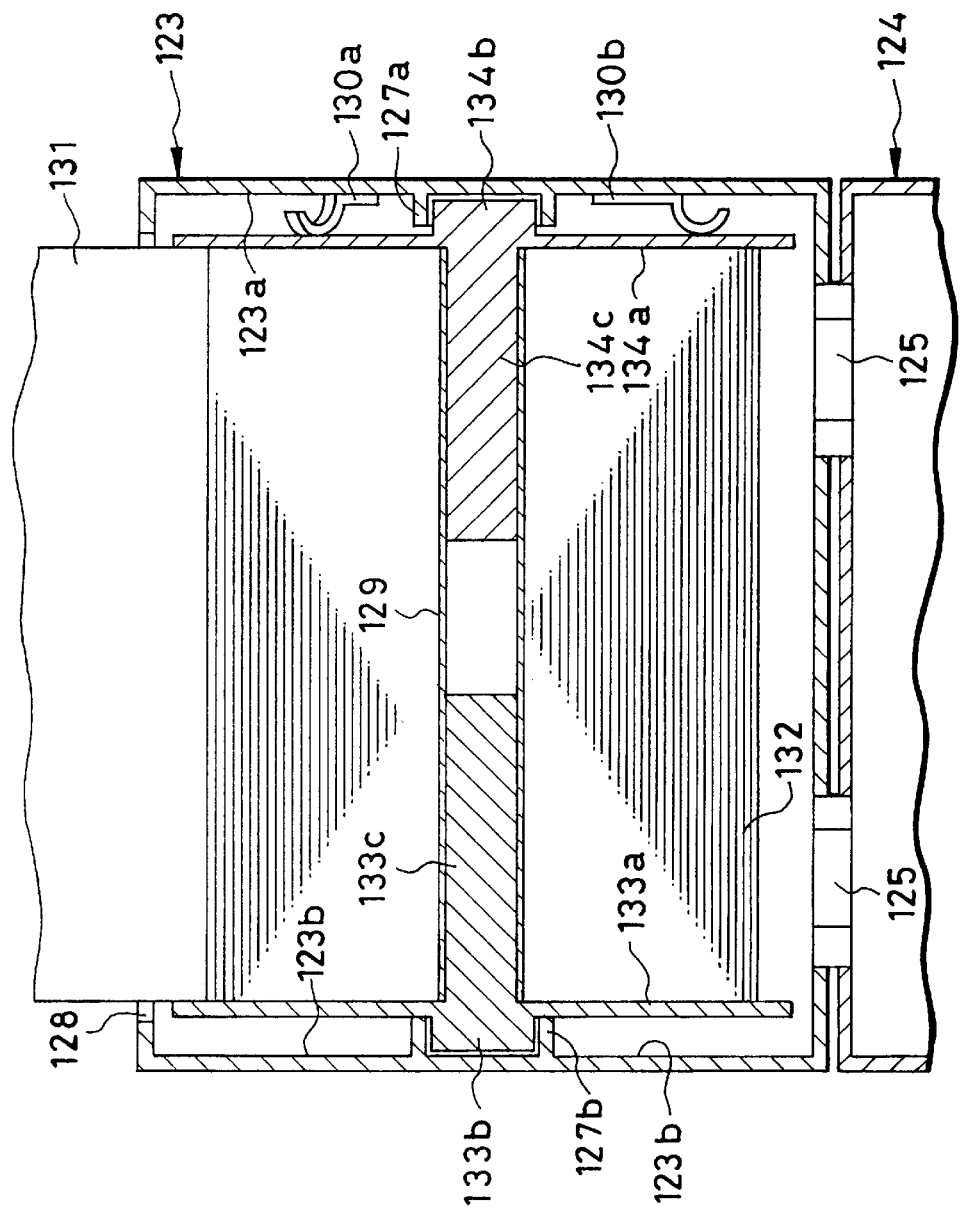
FIG. 13 is a sectional view of the paper magazine shown in FIG. 12.

Next, FIG. 12 shows another embodiment of the paper magazine according to the present invention. In FIGS. 12 and 13, a box-type paper magazine 122 comprises a case main body 123 and a cover 124. An upper portion of the case main body 123 is opened. The cover 124 is rotatably attached to the case main body 123 via a hinge portion 125. The paper magazine 122 is made of plastic having a light shielding property in order to contain a recording paper roll 132 of a color thermal recording paper 131 having a heat sensitive property and ultraviolet fixing property. On both side faces 123a and 123b of the case main body 123, U-shaped bearings 127a and 127b, an upper portion of which is opened, are integrally formed. Three plate springs 130a, 130b and 130c are attached to the side face 123a of the case main body 123. The plate springs 130a–130c are disposed on a concentric circle centering around the bearing 127a at equal intervals. At front lower portion of the case main body 123, there is provided a draw-out mouth 128 for drawing out the recording paper 131 and feeding it to the color thermal printer.

The film-like recording paper 131 is wound around a core 129 made of paper or plastic to constitute the paper roll 132. When the paper roll 132 is loaded in the paper magazine 122, flanges 133 and 134 are fitted into the core 129 from right and left thereof. The flange 133 is constituted of a circular flange portion 133a, a shaft portion 133b and a support portion 133c. The shaft portion 133b and the support portion 133c are respectively provided on both sides of the flange portion 133a. The other flange 134 is similar to the flange 133 so that description about it is omitted although reference numerals are given as 134a (circular flange portion), 134b (shaft portion), and 134c (support portion) the paper roll 132 is caught between the flange portions 133a and 134a. Accordingly, the recording paper 131 is prevented from meandering when it is drawn out.

In the paper magazine 122, three points located on the concentric circle of the flange portion 133a are uniformly pushed by the plate springs 130a–130c. Thus, the flanges 133 and 134 are pushed toward the bearing 127b in a state that the flanges 133 and 134 catch both sides of the paper roll 132. Accordingly, the paper roll 132 is prevented from changing its position due to looseness of the flanges 133 and 134. Further, suitable back tension is given to the paper roll 132 by friction of the plate springs 130a–130c and the flange portion 133a. Incidentally, the strength of the back tension may be easily changed by changing the spring force of the plate springs 130a–130c.

When the paper roll 132 is loaded in the paper magazine 122, the support portions 133c and 134c of the flanges 133 and 134 are fitted into the core 129 and the flange portions 133a and 134a are put on the side face of the paper roll 132. Next, the shaft portions 133b and 134b of the flange 133 and 134 are fitted into the bearings 127a and 127b of the case main body 123 from the top thereof. After the leading edge of the recording paper 11 passed through the draw-out mouth 128, the case main body 123 is covered with the case cover 124 and locked by a lock mechanism (not shown) so as not to be opened.

The plate springs 130a, 130b and 130c contact the side face of the flange portion 133a and press it so that the paper roll 132 is pressed toward the side face 123b of the case main body 123. Thus, the paper roll 132 is held at a prescribed position of the paper magazine 122 without looseness.

The plate springs 130a, 130b and 130c are disposed on the concentric circle about the rotational center of the paper roll 132 so as to position them around the bearing 127a. Accordingly, the flange portion 133a is uniformly pressed and the recording paper 131 is drawn out in a stable state. Moreover, prescribed back tension is applied to the rotation of the paper roll 132 by means of the bias of the plate springs 130a, 130b and 130c.

Figure 14:
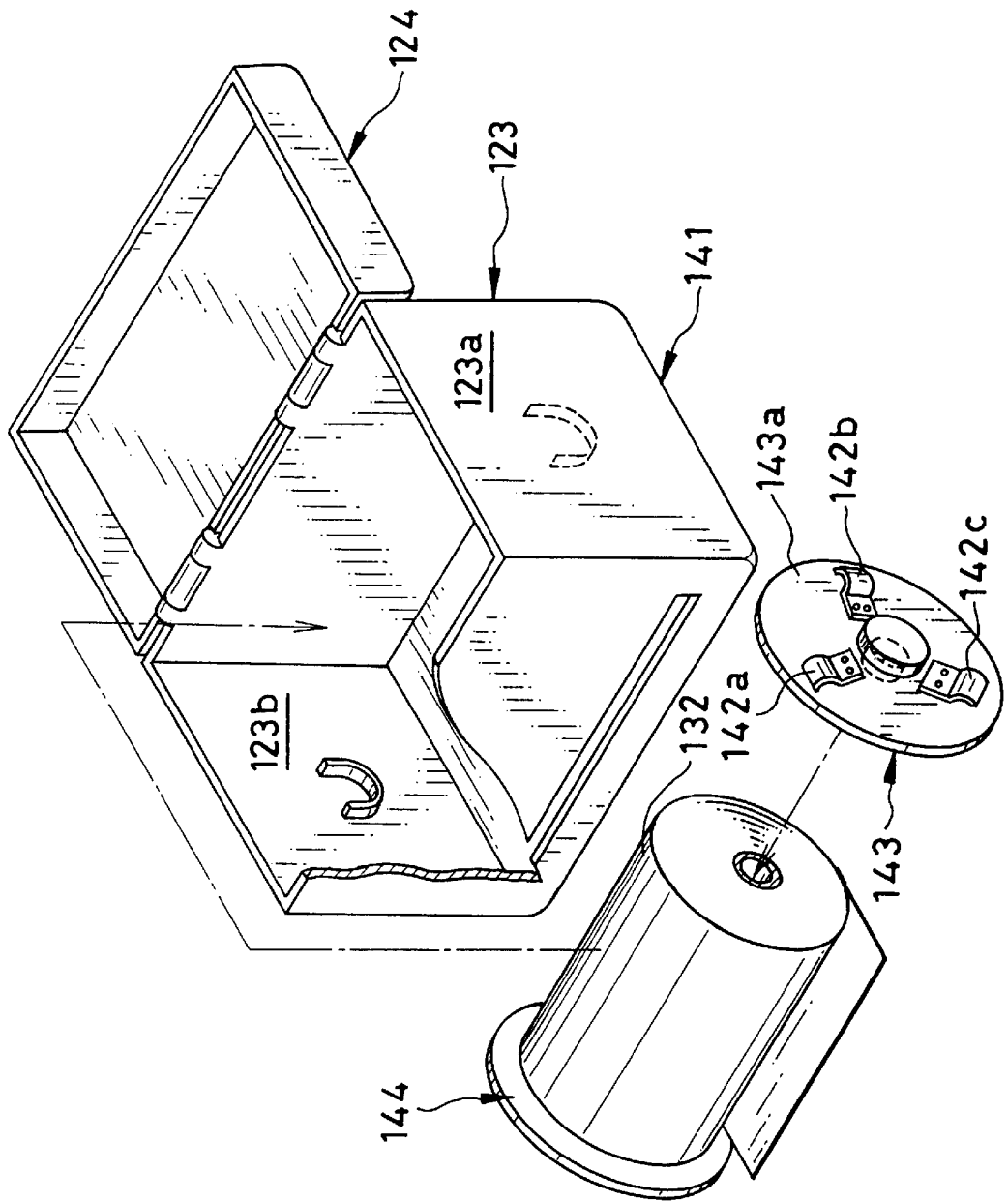
FIG. 14 is a perspective view showing a eighth embodiment of the paper magazine according to the present invention.
Figure 15:
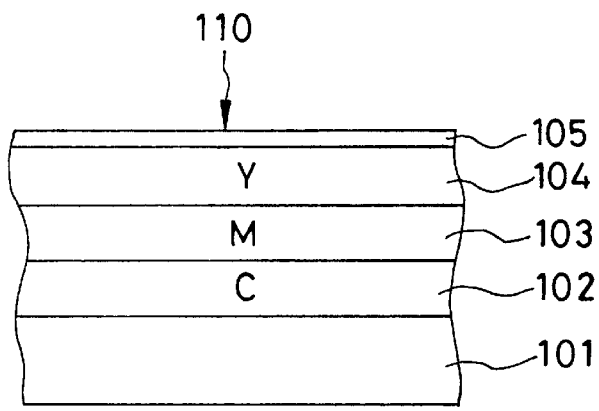
FIG. 15 is an explanatory illustration showing an example of layer construction of a color thermal recording paper.
Figure 16:
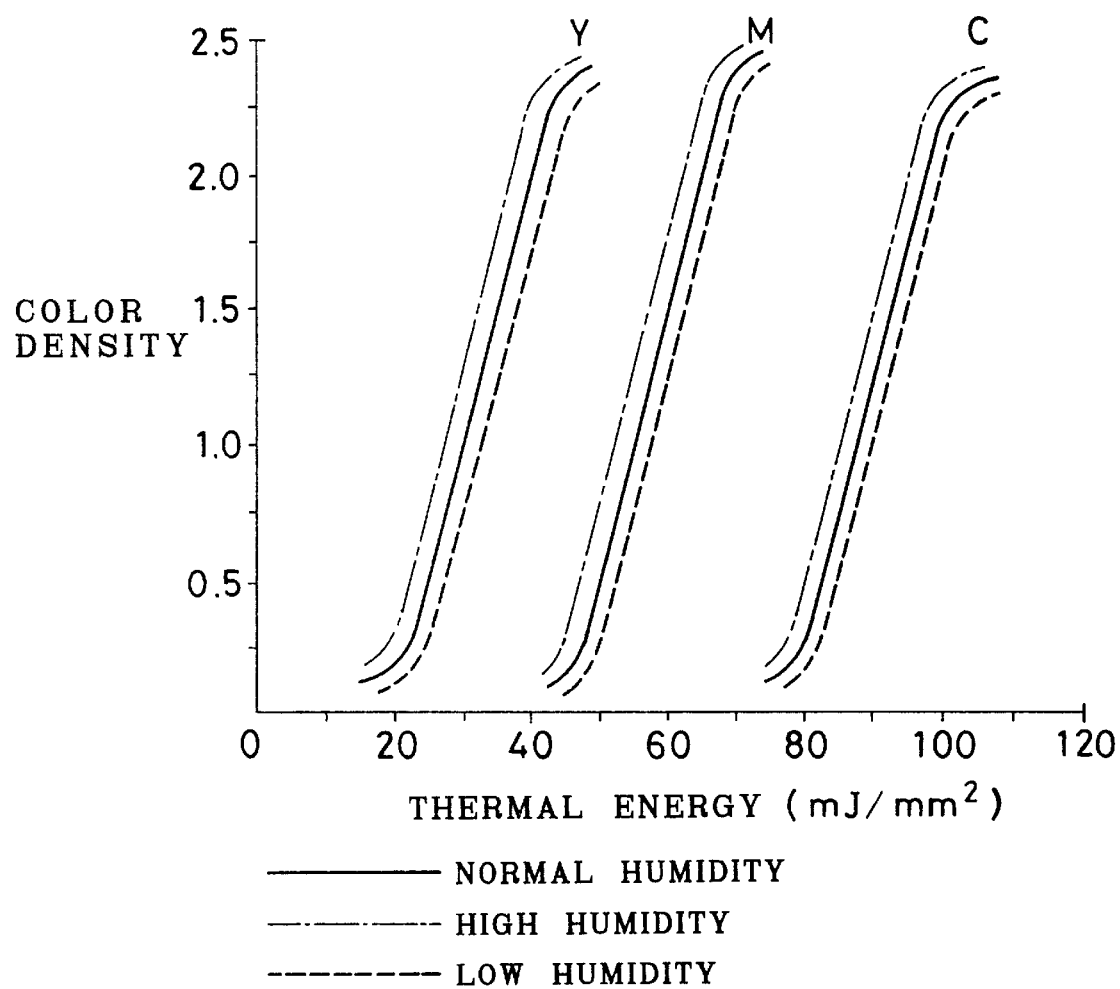
FIG. 16 is a graph showing a relationship between thermal energy and color density.

In the above embodiment, the plate springs 130a–130c are attached to the case main body 123. However, for example, the plate springs may be provided on the flange as shown in FIG. 14.

As to a paper magazine 141, plate springs 142a, 142b and 142c are provided on a flange portion 143a of a flange 143. Thus, the plate springs 142a–142c attached to the flange portion 143a press the side face 123a of the case main body 123 so that the paper roll 132 caught between the flanges 143 and 144 is pushed toward the side face 123b of the case main body 123.

By such a structure, the paper roll 132 is kept in the paper magazine 141 without looseness and the recording paper 131 may be drawn out straight without meandering. Further, suitable back tension is applied to the paper roll 132 due to the bias of the plate springs 142a–142c so that the paper roll 132 is not needlessly rotated by inertia when the drawing of the recording paper is stopped. Moreover, it is not necessary to provide an expensive clutch device and a precision bearing mechanism so that the paper magazine may be manufactured with a simple structure and at low cost.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A paper magazine for a thermal recording paper roll in which a roll of a thermal recording paper optically fixed by ultraviolet rays is rotatably contained, said paper magazine being provided with a draw-out mouth through which said thermal recording paper is drawn out and fed to a thermal printer, said paper magazine comprising:

a lower case having said draw-out mouth, said lower case being made of light shielding resin;

an upper case swingably connected with said lower case, said upper case being made of light shielding resin;

a packing provided on a contact portion between said lower case and said upper case;

means for drawing a leading edge of said thermal recording paper back into said paper magazine after printing; and means for contacting said leading edge of said thermal recording paper with an outer periphery of said roll in a contact position, such that said thermal recording paper can be reversably fed out by said means for contacting from said contact position through said draw-out mouth to said thermal printer.

2. A paper magazine according to claim 1, further comprising:

a shutter for opening and closing said draw-out mouth.

3. A paper magazine according to claim 2, further comprising means for operating said shutter, wherein said shutter is lifted by said shutter operating means and opens said draw-out mouth while said paper magazine is either one of set in said thermal printer and said thermal recording paper is fed to said thermal printer.

4. A paper magazine according to claim 2, further comprising:

means for indicating a remainder of said thermal recording paper in accordance with a diameter of said roll.

5. A paper magazine according to claim 2, further comprising:

a pair of flanges disposed on both sides of said roll; and means for biasing said roll by coming into contact with one of said flanges and pressing said roll toward the other of said flanges.

6. A paper magazine according to claim 2, further comprising:

a humidity conditioning material disposed in said paper magazine, said humidity conditioning material which absorbs moisture when an inside of said paper magazine is high in humidity and performs humidification when said inside of said paper magazine is low in humidity.

7. A paper magazine for a thermal recording paper roll in which a roll of a thermal recording paper having a core and optically fixed by ultraviolet rays is rotatably contained, said paper magazine being removably attached to a thermal printer and provided with a draw-out mouth through which said thermal recording paper is drawn out and fed to said thermal printer, said paper magazine comprising:

a paper magazine main body provided with said draw-out mouth, said main body being made of light-shielding material;

a groove engaging with said core of said paper roll and movably supporting said thermal recording paper roll for movement along said groove;

a roller for contacting said roll and winding said thermal recording paper of said thermal recording paper roll such that said roller contacts a leading edge of said recording paper with an outer periphery of said roll in a contact position; and means for biasing said thermal recording paper roll against said roller along said groove, such that said roller always contacts an outer periphery of said thermal recording paper roll;

wherein said biasing means allows said thermal recording paper to be reversably fed out by said roller through said draw-out mouth from said contact position.

8. A paper magazine for a thermal recording paper roll in which a roll of a thermal recording paper optically fixed by ultraviolet rays is rotatably contained, said paper magazine being provided with a draw-out mouth through which said thermal recording paper is drawn out and fed to a thermal printer, said paper magazine comprising:

means for winding back said thermal recording paper sent out from said paper magazine by rotating said roll after printing; and means for contacting a leading edge of said thermal recording paper wound around said roll with an outer periphery of said roll, in a contact position, such that said thermal recording paper can be reversably fed out by said means for contacting from said contact position through said draw-out mouth to said thermal printer.

9. A paper magazine according to claim 8, further comprising a drive means for driving said wind-back means, said drive means being provided in said thermal printer.

10. A paper magazine according to claim 9, wherein said contact means is a roller coming into contact with said outer periphery of said roll.

11. A paper magazine according to claim 10, wherein said roller is driven by said drive means, whereby said roller is used as said wind-back means.

12. A paper magazine according to claim 11, further comprising:

means for biasing said roll toward said roller, said bias means for causing contact of said outer periphery of said roll with said roller regardless of a diameter of said roll.

13. A paper magazine according to claim 9, wherein said contact means is a sheet-like member coming into contact with a part of said outer periphery of said roll.

14. A paper magazine according to claim 13, wherein said sheet-like member is an endless belt attached to at least two supporting rollers.

15. A paper magazine according to claim 14, wherein a number of said supporting rollers is three, two of said supporting rollers being disposed on a line crossing said roll, and a third of said supporting rollers being disposed at a position forming a triangle with said two supporting rollers and movable in a separate direction from said roll.

16. A paper magazine according to claim 15, wherein at least one of said supporting rollers is rotated by said drive means to move said endless belt, whereby said roll is rotated so that said thermal recording paper is sent out through said draw-out mouth, and said endless belt is used as said wind-back means by rotating said at least one of said supporting rollers in reverse direction with said drive means.

17. A paper magazine according to claim 14, further comprising:

means for urging and tightening said endless belt, said urging means interposing at a position except that said endless belt comes into contact with said outer periphery of said roll and contacting said endless belt with said outer periphery of said roll regardless of a diameter of said roll.

18. A paper magazine according to claim 17, wherein said urging means is a spring.

19. A paper magazine for a thermal recording paper roll in which a roll of a thermal recording paper optically fixed by ultraviolet rays is rotatably contained, said paper magazine being provided with a draw-out mouth through which said thermal recording paper is drawn out and fed to a thermal printer, said paper magazine comprising:

a lower case having said draw-out mouth, said lower case being made of light shielding resin;

an upper case swingably connected with said lower case, said upper case being made of light shielding resin;

a packing provided on a contact portion between said lower case and said upper case; and means for drawing a leading edge of said thermal recording paper back into said paper magazine after printing and for contacting a leading edge of said recording paper with an outer periphery of said roll in a contact position;

wherein said drawing means allows said leading edge of said thermal recording paper to be reversably fed out by said drawing means through said draw-out mouth from said contact position.

20. A paper magazine for a thermal recording paper roll in which a roll of a thermal recording paper optically fixed by ultraviolet rays is rotatably contained, said paper magazine being provided with a draw-out mouth through which said thermal recording paper is drawn out and fed to a thermal printer, said paper magazine comprising:

a lower case having said draw-out mouth, said lower case being made of light shielding resin;

an upper case swingably connected with said lower case, said upper case being made of light shielding resin;

a packing provided on a contact portion between said lower case and said upper case;

means for drawing a leading edge of said thermal recording paper back into said paper magazine after printing and for contacting a leading edge of said recording paper with an outer periphery of said roll in a contact position, wherein said drawing means allows said leading edge of said thermal recording paper to be reversably fed out by said drawing means through said draw-out mouth from said contact position, wherein said drawing means allows said leading edge of said thermal recording paper to be reversably fed out by said drawing means through said draw-out mouth from said contact position;

a shutter for opening and closing said draw-out mouth; and means for operating said shutter, wherein said shutter is lifted by said shutter opening means and opens said draw-out mouth while said paper magazine is either one of set in said thermal printer and said thermal recording paper is fed to said thermal printer.

21. A paper magazine for a thermal recording paper roll in which a roll of a thermal recording paper optically fixed by ultraviolet rays is rotatably contained, said paper magazine being removably attached to a thermal printer and provided with a draw-out mouth through which said thermal recording paper is drawn out and fed to said thermal printer, said paper magazine comprising:

a paper magazine main body provided with said draw-out mouth, said main body being made of light-shielding material;

a shutter attached to said paper magazine main body for opening and closing said draw-out mouth; and means for both contacting a leading edge of said thermal recording paper and winding of said thermal recording paper such that, said thermal recording paper can be reversably fed out by said means for contacting and winding through said draw-out mouth from a position wherein said contacting means contacts said leading edge of said thermal recording paper with an outer periphery of said roll to said thermal printer.

22. A paper magazine according to claim 21, wherein a packing is arranged so as to surround said draw-out mouth.

23. a paper magazine according to claim 21, wherein said paper magazine main body is constituted of a lower case containing said roll and an upper case closing said lower case in light-tight manner.

24. A paper magazine according to claim 23, wherein said lower case and said upper case are connected with a hinge.

25. A paper magazine according to claim 24, wherein a packing is arranged at a contact portion between said lower case and said upper case.

26. A paper magazine according to claim 23, wherein said contacting and winding means feeds said thermal recording paper from said roll to said thermal printer through said draw-out mouth, said contacting and winding means being disposed in said paper magazine main body.

27. A paper magazine according to claim 28, wherein said contacting and winding means is disposed near said draw-out mouth, and is a roller, and said roller comes into contact with said roll to send said thermal recording paper out.

28. A paper magazine according to claim 27, wherein said contacting and winding means includes means for driving said contacting and winding means, and said roller, to which a drive force of said thermal printer is transmitted by said driving means, is rotated in association with a printing operation of said thermal printer.

29. A paper magazine according to claim 28, wherein said drive force is transmitted via a clutch.

30. A paper magazine according to claim 29, wherein said clutch is attached to said thermal printer.

31. A paper magazine according to claim 28, wherein said roller is rotated in a reverse direction by said driving means to put said thermal recording paper back in said paper magazine main body after printing.

32. A paper magazine according to claim 31, further comprising means for operating said shutter, wherein said operating means moves said shutter to close said draw-out mouth after pulling said thermal recording paper back in said paper magazine main body by said roller.

33. A paper magazine according to claim 26, wherein said shutter is moved by means for operating said shutter provided in said thermal printer in order to open said draw-out mouth when said paper magazine is set in said thermal printer.

34. A paper magazine according to claim 26, wherein said shutter opens and closes said draw-out mouth by hand operation.

35. A paper magazine according to claim 26, wherein said shutter opens and closes said draw-out mouth in association with setting of said paper magazine to said thermal printer.

* * * * *